(12) United States Patent
Yoshida

(10) Patent No.: US 12,004,280 B2
(45) Date of Patent: Jun. 4, 2024

(54) DISPLAY DEVICE

(71) Applicant: Shanghai Tianma Micro-Electronics Co., Ltd., Shanghai (CN)

(72) Inventor: Hitoshi Yoshida, Kanagawa (JP)

(73) Assignee: Shanghai Tianma Micro-Electronics Co., Ltd., Shanghai (CN)

(*) Notice: Subject to any disclaimer, the term of this patent is extended or adjusted under 35 U.S.C. 154(b) by 0 days.

(21) Appl. No.: 17/855,950

(22) Filed: Jul. 1, 2022

(65) Prior Publication Data

US 2023/0017713 A1   Jan. 19, 2023

(30) Foreign Application Priority Data

Jul. 15, 2021 (JP) ................................ 2021-117072
Mar. 24, 2022 (JP) ................................ 2022-048478

(51) Int. Cl.
| | | |
|---|---|---|
| G02F 1/1335 | (2006.01) | |
| F21V 8/00 | (2006.01) | |
| G02F 1/1333 | (2006.01) | |
| G09G 3/34 | (2006.01) | |
| G09G 3/36 | (2006.01) | |
| H05B 47/11 | (2020.01) | |

(52) U.S. Cl.
CPC ........... *H05B 47/11* (2020.01); *G02B 6/0043* (2013.01); *G02F 1/133374* (2021.01); *G02F 1/133388* (2021.01); *G02F 1/133626* (2021.01); *G09G 3/342* (2013.01); *G09G 3/36* (2013.01); *G09G 2360/144* (2013.01)

(58) Field of Classification Search
CPC . H05B 47/11; G02B 6/0043; G02F 1/133374; G02F 1/133388; G09G 3/342; G09G 3/36; G09G 2360/144
USPC ....................................................... 349/61–68
See application file for complete search history.

(56) References Cited

U.S. PATENT DOCUMENTS

2022/0176821 A1* 6/2022 Hart .................. G02F 1/133509

FOREIGN PATENT DOCUMENTS

| JP | 2008-209764 A | 9/2008 | |
|---|---|---|---|
| JP | 2018-077503 A | 5/2018 | |
| WO | WO-2018083217 A1 * | 5/2018 | ............... G09F 9/30 |

* cited by examiner

*Primary Examiner* — Charles S Chang
(74) *Attorney, Agent, or Firm* — Sughrue Mion, PLLC

(57) ABSTRACT

A display device includes a first liquid crystal display, a decorative member, an illuminator, and a controller. The decorative member is disposed on a display surface side of the first liquid crystal display, and includes a first display region in which a display of the first liquid crystal display is transparently displayed and a first non-display region adjacent to the first display region. The illuminator illuminates the first non-display region from the back surface. The controller controls, in accordance with a luminance of a first black display region, of the first display region, that corresponds to a black display portion the first liquid crystal display, an amount of illumination light emitted from the illuminator toward the first non-display region.

8 Claims, 18 Drawing Sheets

DISPLAY DEVICE

CROSS-REFERENCE TO RELATED APPLICATION

This application claims the benefit of Japanese Patent Application No. 2021-117072, filed on Jul. 15, 2021, and Japanese Patent Application No. 2022-048478, filed on Mar. 24, 2022, of which the entirety of the disclosures is incorporated by reference herein.

FIELD

The present disclosure relates generally to a display device.

BACKGROUND

In the related art, liquid crystal display devices are known in which a light-transmitting decorative member is disposed on a display surface side of a liquid crystal display panel to improve design. For example, Unexamined Japanese Patent Application Publication No. 2008-209764 describes a liquid crystal display device including a liquid crystal display panel that includes a non-display region around a display region, a first light-transmitting member that is disposed on a front surface side of the liquid crystal display panel and that is formed from a dark color material, and a second light-transmitting member that is disposed on a back surface side of the liquid crystal display panel.

With the liquid crystal display device of Unexamined Japanese Patent Application Publication No. 2008-209764, the first light-transmitting member includes a first light-blocking layer and a first gradation layer. The first light-blocking layer corresponds to the non-display region of the liquid crystal display panel. The first gradation layer is provided corresponding to the periphery of the display region of the liquid crystal display panel. The second light-transmitting member includes a second light-blocking layer, a third light-blocking layer, and a second gradation layer. The second light-blocking layer is provided corresponding to the non-display region of the liquid crystal display panel. The third light-blocking layer and the second gradation layer are provided so as to so as to have a boundary between the third light-blocking layer and the second gradation layer at a location that corresponds to the first gradation layer and also corresponds to the first gradation layer.

In Unexamined Japanese Patent Application Publication No. 2008-209764, the light-blocking layers are provided in a region that corresponds to the non-display region, and the gradation layers are provided in a region that corresponds to the periphery of the display region. Due to this configuration, visual recognition of the boundary line between the display region and the non-display region of the liquid crystal display panel is prevented, and the design of the liquid crystal display device is improved.

With the liquid crystal display device of Unexamined Japanese Patent Application Publication No. 2008-209764, the gradation layers are provided in the region that corresponds to the periphery of the display region and, as such, the display in the periphery of the display region is darker and the visibility of the display is reduced.

SUMMARY

A display device of the present disclosure includes:
a first liquid crystal display;
a decorative member that is disposed on a display surface side of the first liquid crystal display, and includes a first display region in which a display of the first liquid crystal display is transparently displayed and a first non-display region adjacent to the first display region;
an illuminator that illuminates the first non-display region from a back surface; and
a controller that controls, in accordance with a luminance of a first black display region, of the first display region, that corresponds to a black display portion of the first liquid crystal display, an amount of illumination light emitted from the illuminator toward the first non-display region.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a display device according to various embodiments is described while referencing the drawings.

Embodiment 1

Figure 1:
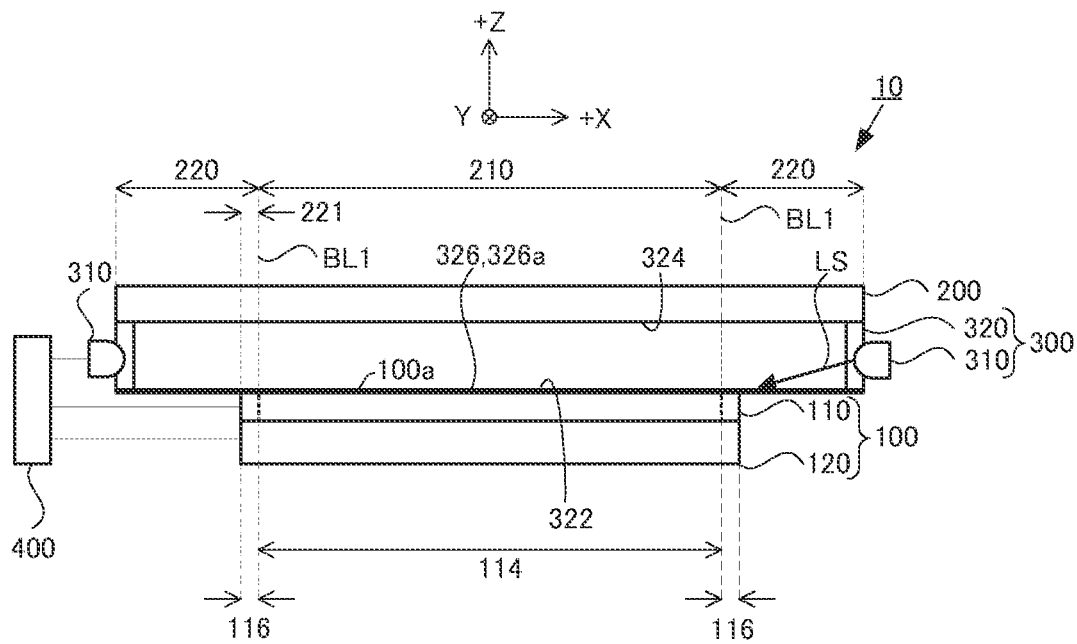
FIG. 1 is a side view illustrating a display device according to Embodiment 1.

A display device 10 according to the present embodiment is described while referencing FIGS. 1 to 10. As illustrated in FIG. 1, the display device 10 includes a first liquid crystal display 100, a decorative member 200, an illuminator 300, and a controller 400. The first liquid crystal display 100 displays characters or images. The decorative member 200 transparently displays a display of the first liquid crystal display 100. The decorative member 200 includes a first display region 210 in which the display of the first liquid crystal display 100 is transparently displayed, and a first non-display region 220 adjacent to the first display region 210. The illuminator 300 illuminates the first non-display region 220 of the decorative member 200 from a back surface. The controller 400 controls an amount of illumination light LE emitted from the illuminator 300 toward the first non-display region 220.

The display device 10 is provided on a dashboard of a vehicle, a piece of furniture, a home electronic device, or the like. Note that, in the present description, to facilitate comprehension, in the display device 10 of FIG. 1, the longitudinal right direction (the right direction on paper) is referred to as the "+X direction", the up direction (the up direction on paper) is referred to as the "+Z direction", and the direction perpendicular to the +X direction and the +Z direction (the depth direction on paper) is referred to as the "+Y direction." Note that a user is positioned on the +Z side of the display device 10.

The first liquid crystal display 100 of the display device 10 is a transmissive liquid crystal display device that displays characters or images. In the present embodiment, the first liquid crystal display 100 is, as described later, adhered to a light guide surface 322 of a light guide 320 of the illuminator 300. The first liquid crystal display 100 includes a first liquid crystal display panel 110 and a first back light 120.

Figure 2:
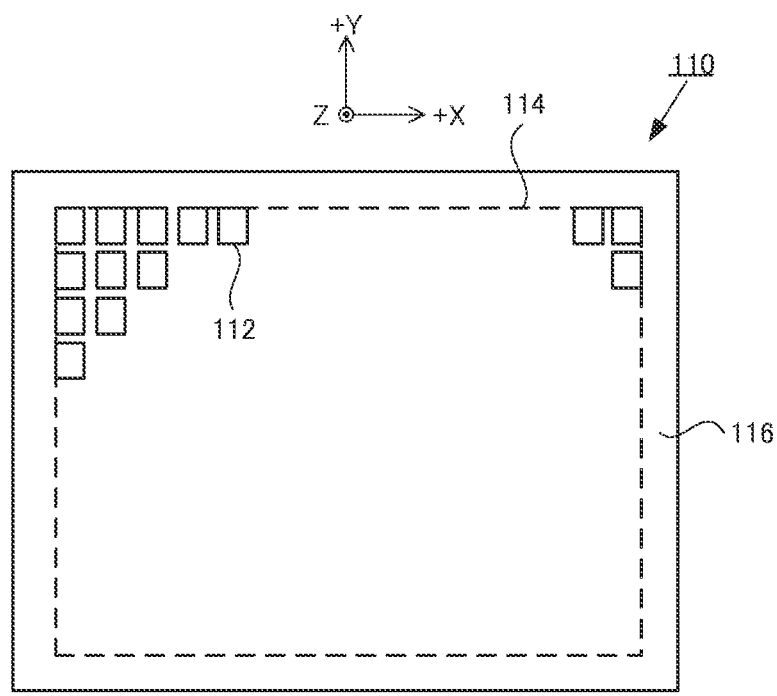
FIG. 2 is a plan view illustrating a first liquid crystal display panel according to Embodiment 1.

In one example, the first liquid crystal display panel 110 of the first liquid crystal display 100 is a horizontal electric field type liquid crystal display panel that is active matrix driven by thin film transistors (TFT). As illustrated in FIG. 2, the first liquid crystal display panel 110 includes a displayable region 114 in which pixels 112 are arranged in a matrix, and a frame region 116 in which wiring, drive circuitry, and the like is disposed and that surrounds the displayable region 114. The displayable region 114 is a region that is capable of displaying characters, images, and the like. The frame region 116 is a region that is incapable of displaying characters, images, and the like. In the present embodiment, as illustrated in FIG. 1, the displayable region 114 corresponds to the first display region 210 of the decorative member 200.

As illustrated in FIG. 1, a first back light 120 of the first liquid crystal display 100 is arranged on a back surface side of the first liquid crystal display panel 110. In one example, the first back light 120 is implemented as a direct back light. The first back light 120 includes a white light emitting diode (LED), a reflective sheet, a diffusion sheet, a lighting circuit, and the like (all not illustrated in the drawings).

The decorative member 200 of the display device 10 has a flat-plate shape, and is disposed on a display surface 100a side of the first liquid crystal display 100. In the present embodiment, the decorative member 200 is adhered to a light emitting surface 324 of the light guide 320 of the illuminator 300, described later.

Figure 3:
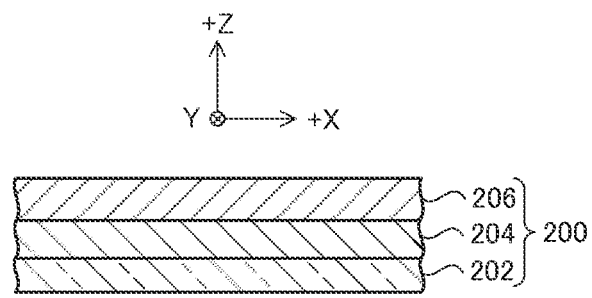
FIG. 3 is a cross-sectional view illustrating a decorative member according to Embodiment 1.

The decorative member 200 is a member that transmits light and that provides design to the user. As illustrated in FIG. 3, the decorative member 200 includes a light-transmitting layer 202, a diffusion layer 204, and a decoration layer 206.

The light-transmitting layer 202 of the decorative member 200 is a light-transmitting flat plate. In one example, the light-transmitting layer 202 is formed from a synthetic resin. The light-transmitting layer 202 protects the diffusion layer 204 and the decoration layer 206 and, also, flattens the diffusion layer 204 and the decoration layer 206. The light emitting surface 324 of the light guide 320 is adhered to the light-transmitting layer 202. The transmittance of the decorative member 200 can be adjusted by adjusting the transmittance of the light-transmitting layer 202. Moreover, reflection of display light that occurs at the interface between the decorative member 200 and the light guide 320 can be suppressed by adjusting the refractive index of the light-transmitting layer 202.

The diffusion layer 204 of the decorative member 200 is provided on (on the +Z side) of the light-transmitting layer 202. Illumination light LE from the illuminator 300 is diffused and made uniform by the diffusion layer 204.

The decoration layer 206 of the decorative member 200 is a layer that provides design to the user. The decoration layer 206 is formed on the diffusion layer 204. In one example, the decoration layer 206 is formed by printing, in a desired color, a desired pattern such as a wood grain, a marble, or a geometric pattern.

Figure 4:
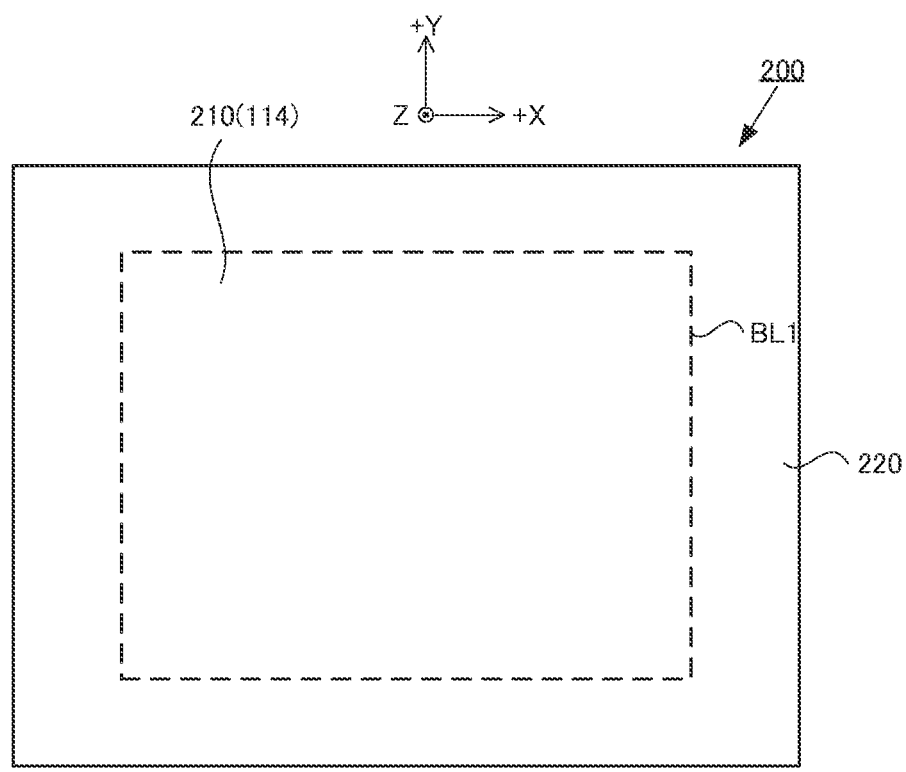
FIG. 4 is a plan view illustrating the decorative member according to Embodiment 1.

As illustrated in FIGS. 1 and 4, the decorative member 200 includes the first display region 210 and the first non-display region 220. The first display region 210 corresponds to the displayable region 114 of the first liquid crystal display 100. The display of the first liquid crystal display 100 is transparently displayed in the first display region 210. The first non-display region 220 is positioned outside the first display region 210 and is adjacent to the first display region 210. The first non-display region 220 includes a region 221 that corresponds to the frame region 116 of the first liquid crystal display panel 110. The first non-display region 220 is a region in which the display of the first liquid crystal display 100 is not displayed.

The illuminator 300 of the display device 10 illuminates the first non-display region 220 of the decorative member 200 from the back surface (the −Z side). As illustrated in FIG. 1, the illuminator 300 includes a light source 310 and the light guide 320.

Figure 5:
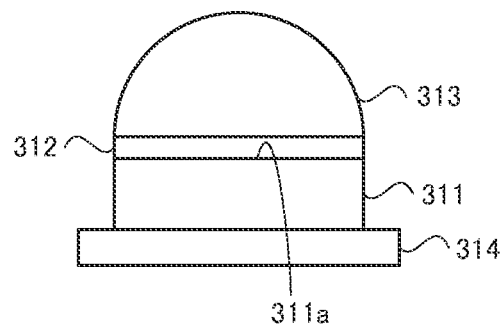
FIG. 5 is a schematic view illustrating a light source according to Embodiment 1.

As illustrated in FIG. 5, the light source 310 of the illuminator 300 includes a light source component 311, a luminance adjustment component 312, a luminance distribution adjustment component 313, and a circuit board 314. In one example, the light source component 311 is implemented as a white LED element. The light source component 311 is provided on a mounting surface of the circuit board 314. In one example, the luminance adjustment component 312 is implemented as a dimming filter that reduces the amount of emitted light from the light source component 311. The luminance adjustment component 312 is disposed on an emission surface 311a of the light source component 311. In one example, the luminance distribution adjustment component 313 is implemented as a lens that focuses the emitted light from the light source component 311. The luminance distribution adjustment component 313 is disposed above the luminance adjustment component 312. In one example, the circuit board 314 is implemented as a flexible board, a printed circuit board, or the like on which the lighting circuit is formed.

Figure 6:
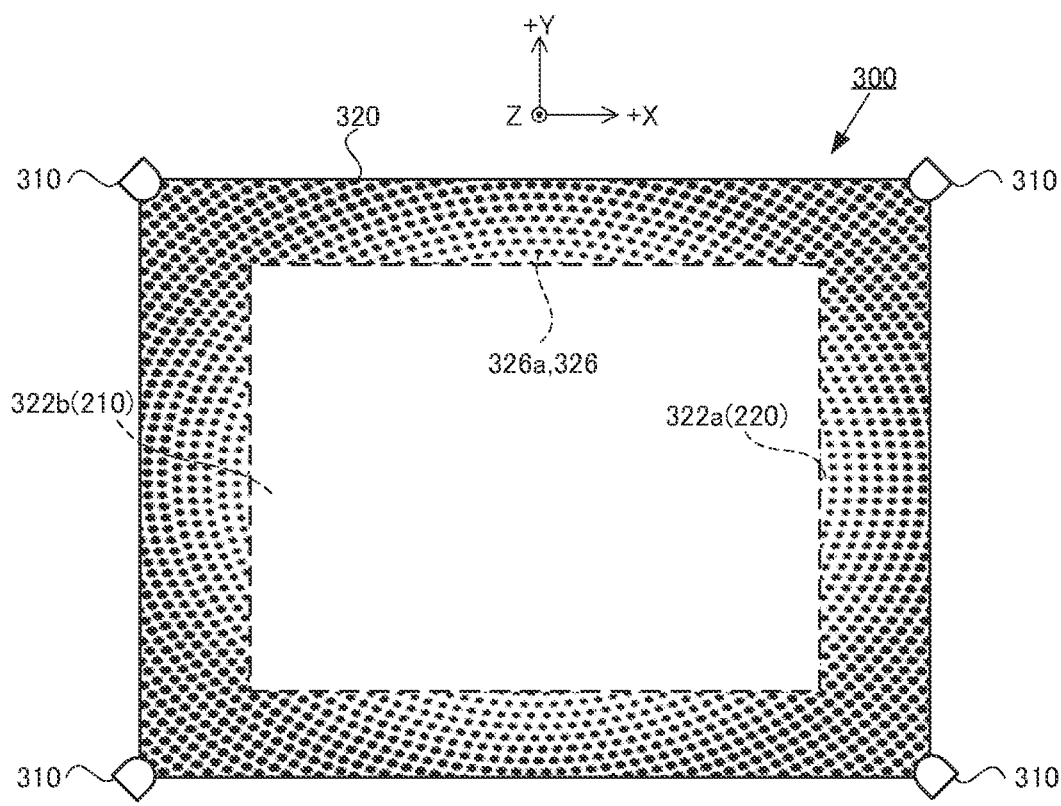
FIG. 6 is a plan view illustrating an illuminator according to Embodiment 1.
Figure 7:
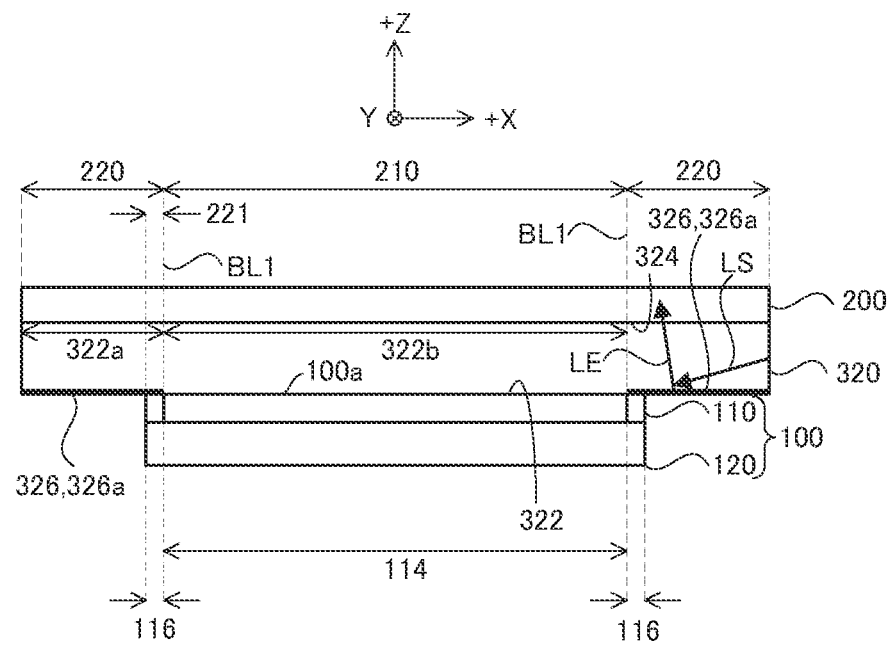
FIG. 7 is a cross-sectional view illustrating a first liquid crystal display, a decorative member, and a light guide according to Embodiment 1.

As illustrated in FIG. 6, the light source 310 is disposed on side surfaces of the four corners of the light guide 320. As illustrated in FIG. 7, light source light LS emitted from the light source 310 is guided into the light guide 320, and is emitted from the light guide 320 toward the first non-display region 220 as the illumination light LE that illuminates the first non-display region 220. As described later, the controller 400 controls the amount of light source light LS emitted from the light source 310. Note that, to facilitate comprehension, in FIG. 6, a diffused reflection layer 326a is illustrated in black. Additionally, in FIG. 7, a cross-section of the first liquid crystal display 100, the decorative member 200, and the light guide 320 is illustrated, but hatching is omitted.

The light guide 320 of the illuminator 300 guides the light source light LS emitted from the light source 310. Additionally, the light guide 320 emits the guided light source light LS toward the first non-display region 220 as the illumination light LE. In the present embodiment, as illustrated in FIG. 7, the light guide 320 is disposed on the display surface 100a side of the first liquid crystal display 100. The light guide 320 covers the display surface 100a of the first liquid crystal display 100.

As illustrated in FIG. 6, the light guide 320 is a flat plate that has a rectangular shape. The four corners (the corners) of the rectangular shape are chamfered. In one example, the light guide 320 is formed from an acrylic resin. As illustrated in FIG. 7, the light guide 320 includes a light guide surface 322 positioned on the −Z side (side opposite the user), and the light emitting surface 324 positioned on the +Z side. The light guide surface 322 guides the light source light LS emitted from the light source 310. The light emitting surface 324 guides the light source light LS emitted from the light source 310 and emits the light source light LS as the illumination light LE. The display surface 100a of the first liquid crystal display 100 is adhered to the light guide surface 322. The decorative member 200 is adhered to the light emitting surface 324. As illustrated in FIG. 6, the light source 310 is disposed on the side surfaces of the four chamfered corners of the light guide 320.

As illustrated in FIGS. 6 and 7, an emission pattern 326 is formed in a region 322a, of the light guide surface 322, that corresponds to the first non-display region 220 of the decorative member 200. In the present embodiment, as illustrated in FIG. 6, the emission pattern 326 is a plurality of dot-like diffused reflection layers 326a, which is printed in the region 322a to allow the guided light source light LS to be emitted from the light emitting surface 324. In one example, the diffused reflection layer 326a is formed from titanium oxide. As illustrated in FIG. 7, the diffused reflection layer 326a diffuse-reflects the guided light source light LS and emits the light source light LS from the light emitting surface 324 as the illumination light LE. As a result, the first non-display region 220 of the decorative member 200 is illuminated from the back surface by the illuminator 300. Additionally, as illustrated in FIG. 6, in the emission pattern 326, a distribution density of the dots increases as distance from the light source 310 increases. The distribution, size, and the like of the dots is adjusted such that the first non-display region 220 of the decorative member 200 is uniformly illuminated. Additionally, it is preferable that the diffused reflection layer 326a has a satin pattern. As a result, the emission pattern 326 can be made more difficult for the user to see.

Note that the emission pattern 326 is not formed in a region 322b, of the light guide surface 322, that corresponds to the first display region 210 of the decorative member 200. Accordingly, there is almost no emission of the illumination light LE toward the first display region 210 of the decorative member 200.

Figure 8:
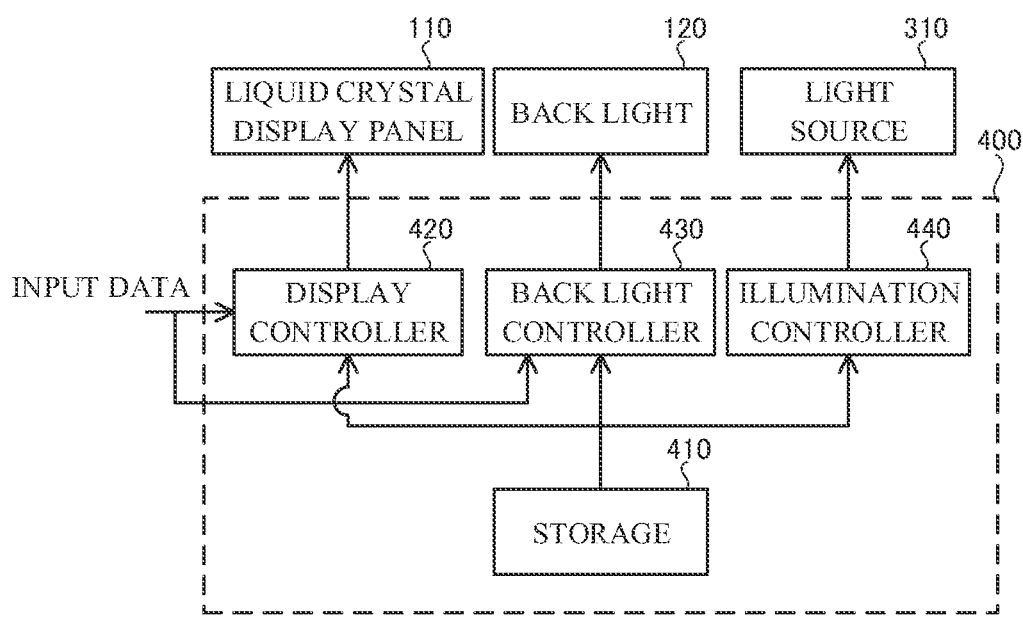
FIG. 8 is a block diagram illustrating the configuration of a controller according to Embodiment 1.

The controller 400 of the display device 10 controls, in accordance with a luminance of a first black display region 212 (see FIG. 9), of the first display region 210, that corresponds to a black display portion of the first liquid crystal display 100, the amount of the illumination light LE emitted from the illuminator 300 toward the first non-display region 220. Additionally, the controller 400 controls the display of the first liquid crystal display panel 110 and a luminance of the first back light 120. As illustrated in FIG. 8, the controller 400 includes a storage 410, a display controller 420, a back light controller 430, and an illumination controller 440.

The storage 410 of the controller 400 stores first gradation-luminance data expressing the relationship between a gradation of the first liquid crystal display panel 110 and the luminance of the first display region 210, and first current-luminance data expressing the relationship between the current flowing to the light source 310 and the luminance of the first non-display region 220. The first gradation-luminance data and the first current-luminance data are measured in advance by experiment. Additionally, the storage 410 stores a program that causes the display controller 420, the back light controller 430, and the illumination controller 440 to function.

The display controller 420 of the controller 400 converts externally inputted image data to image data having luminance-gradation characteristics suited for the display of the first liquid crystal display panel 110. This conversion is performed on the basis of the first gradation-luminance data stored in the storage 410. The display controller 420 sends an image signal expressing the generated image data to a driver circuit (not illustrated in the drawings) of the first liquid crystal display panel 110. The first liquid crystal display panel 110 displays characters, images, or the like on the basis of the sent image signal.

The back light controller 430 of the controller 400 controls the luminance of the first back light 120 on the basis of externally inputted image data and the first gradation-luminance data stored in the storage 410. The back light controller 430 sends a back light control signal expressing the luminance of the first back light 120 to the lighting circuit of the first back light 120. The first back light 120 lights on the basis of the sent back light control signal.

Figure 9:
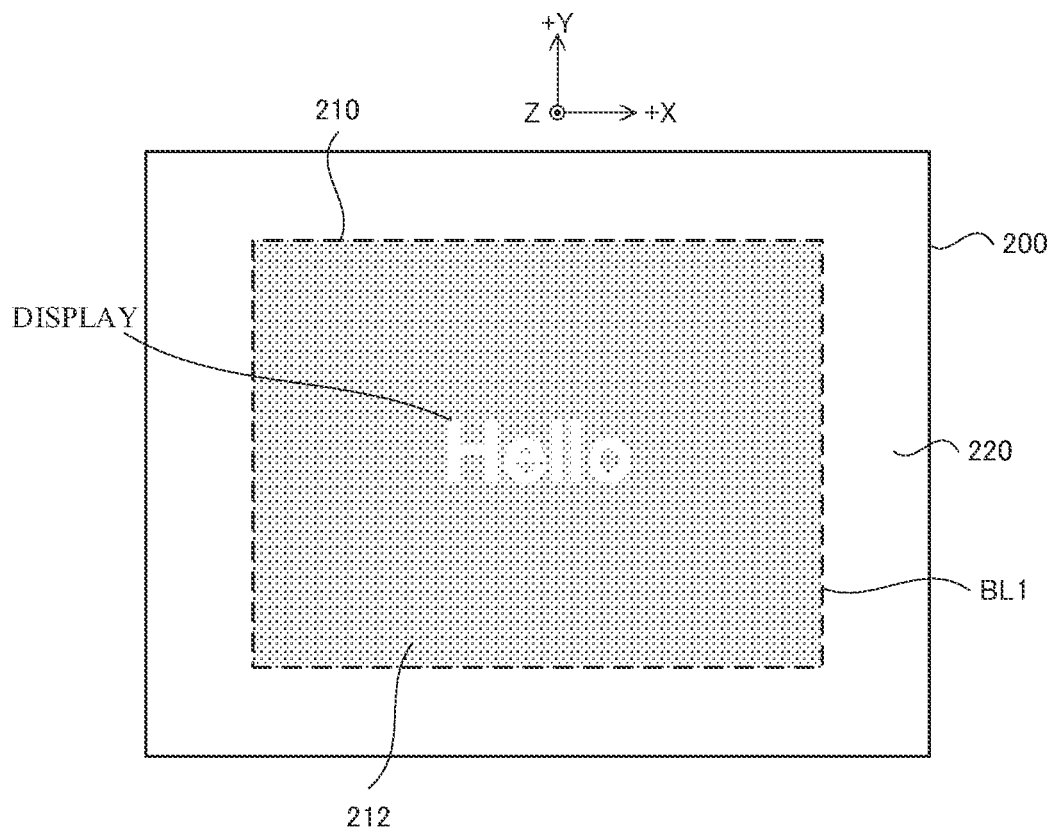
FIG. 9 is a schematic view illustrating a display in the decorative member according to Embodiment 1.

The illumination controller 440 of the controller 400 controls the amount of illumination light LE emitted from the illuminator 300 toward the first non-display region 220 by controlling the amount of light source light LS emitted from the light source 310 of the illuminator 300. Specifically, the illumination controller 440 controls, in accordance with the luminance of the first black display region 212, of the first display region 210, that corresponds to the black display portion of the first liquid crystal display 100, the amount of light source light LS emitted from the light source 310. In this case, the black display portion of the first liquid crystal display 100 is a portion in the displayable region 114 of the first liquid crystal display panel 110 in which black is being displayed. As illustrated in FIG. 9, the first black display region 212 of the first display region 210 is a portion of the first display region 210 in which black is being displayed. Note that, in FIG. 9, to facilitate comprehension, hatching is used to illustrate the first black display region 212.

Figure 10:
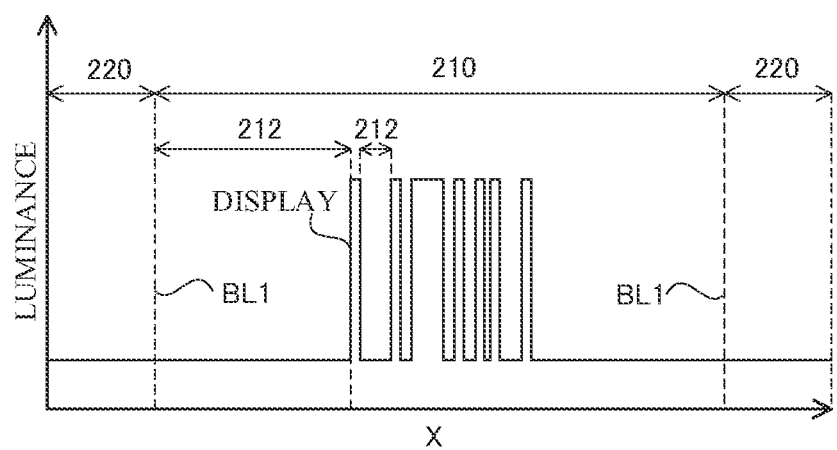
FIG. 10 is a drawing illustrating a luminance distribution in the decorative member according to Embodiment 1.

In the present embodiment, the illumination controller 440 controls the amount of light source light LS emitted from the light source 310 (that is, the amount of illumination light LE emitted from the illuminator 300 toward the first non-display region 220) to an amount that causes the luminance of the first non-display region 220 to match the luminance of the first black display region 212 of the first display region 210. This control is carried out on the basis of the first current-luminance data and the first gradation-luminance data stored in the storage 410. As a result, as illustrated in FIG. 10, the luminances of the first black display region 212 of the first display region 210 and the first non-display region 220 match and, as such, the boundary BL1 between the first display region 210 and the first non-display region 220 is more difficult to see and the design of the display device 10 is improved. The illumination controller 440 sends a current value signal, expressing a current value to be caused to flow to the light source 310, to the lighting circuit of the light source 310. The light source 310 emits the light source light LS on the basis of the current value signal.

The controller 400 is configured from a central processing unit (CPU), a memory, and the like. In one example, the CPU executes programs stored in the memory to realize the functions of the controller 400.

As described above, the illuminator 300 illuminates the first non-display region 220 of the decorative member 200 from the back surface, thereby causing the luminance of the first non-display region 220 of the decorative member 200 to match the luminance of the first black display region 212 of the first display region 210 of the decorative member 200. As a result, the display device 10 can make the boundary BL1 between the first display region 210 and the first non-display region 220 more difficult to see. Additionally, it is unnecessary to obstruct the light (display light) emitted from the first display region 210 of the decorative member 200 by a gradation layer (layer that gradually reduces the luminance of the surrounding areas of the first display region 210 toward the first non-display region 220). As such, reductions of the visibility of the display device 10 are eliminated.

Embodiment 2

A configuration is possible in which the display device 10 includes a detector 500 that detects external light, and the amount of illumination light LE emitted toward the first non-display region 220 (the light source light LS emitted from the light source 310) is controlled in accordance with at least one of a brightness and a color temperature of the external light detected by the detector 500.

Figure 11:
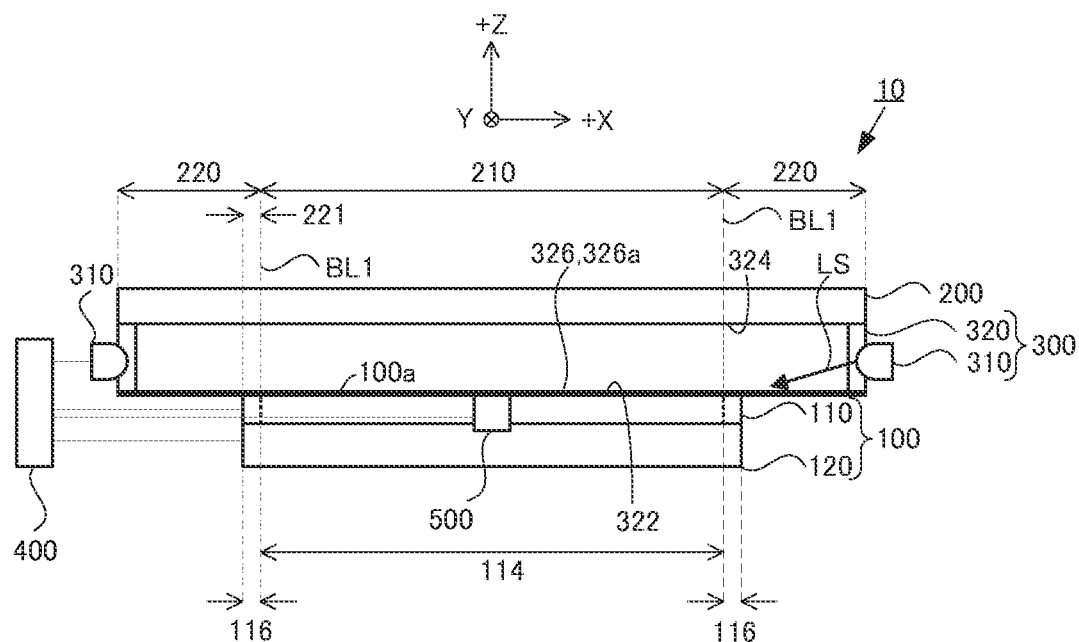
FIG. 11 is a side view illustrating a display device according to Embodiment 2.

As illustrated in FIG. 11, the display device 10 of the present embodiment includes a first liquid crystal display 100, a decorative member 200, an illuminator 300, a controller 400, and a detector 500. The configurations of the first liquid crystal display 100, the decorative member 200, and the illuminator 300 of the present embodiment are the same as in Embodiment 1 and, as such, here, the controller 400 and the detector 500 of the present embodiment are described.

The detector 500 detects external light. Here, the term "external light" refers to light that is incident on the decorative member 200 from around the display device 10. In one example, the detector 500 is implemented as an illuminance sensor, and detects the brightness of the external light. The detector 500 sends an external light signal expressing the detected brightness of the external light to the controller 400.

Figure 12:
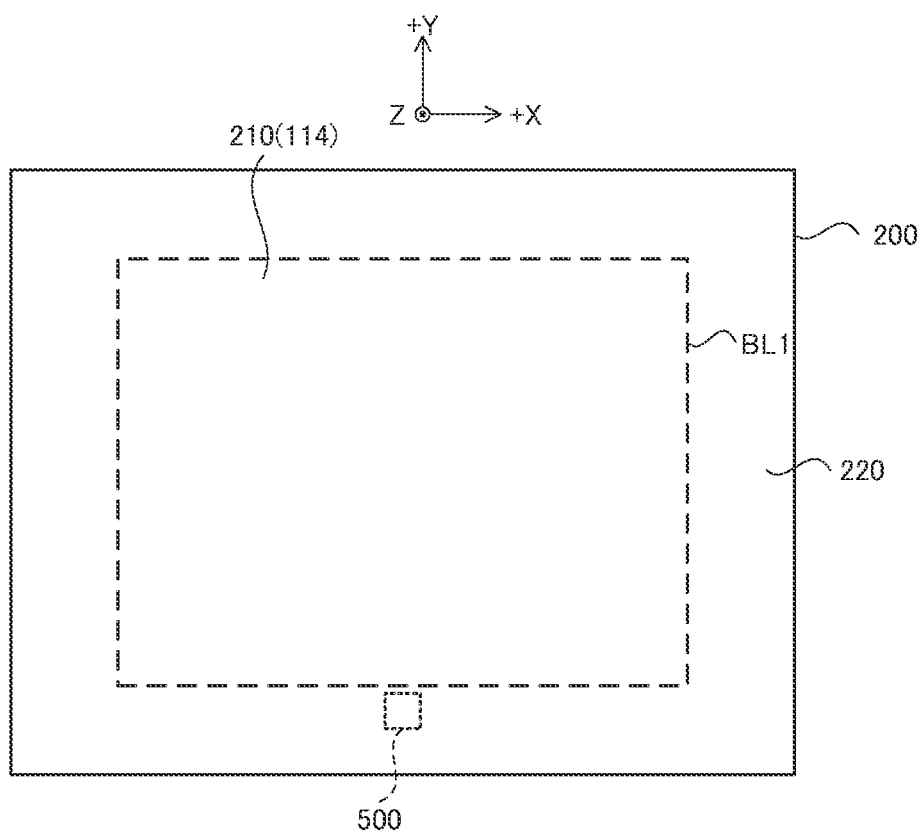
FIG. 12 is a plan view illustrating the arrangement of a detector according to Embodiment 2.
Figure 13:
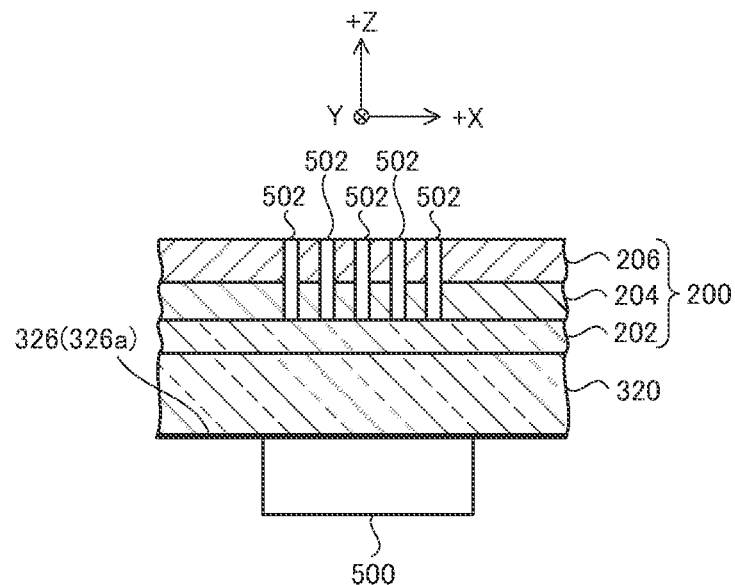
FIG. 13 is a cross-sectional view illustrating a decorative member and a light guide according to Embodiment 2.

In one example, as illustrated in FIG. 11, the detector 500 is provided on the light guide surface 322 of the light guide 320. Additionally, as illustrated in FIG. 12, when viewing the display device 10 planarly from the +Z direction, the detector 500 is disposed at a position, of the first non-display region 220 of the decorative member 200, near the first display region 210. Note that, as illustrated in FIG. 13, it is preferable that light-transmitters 502 that transmit the external light be provided at portions, in the diffusion layer 204 and the decoration layer 206, positioned on the +Z side (directly above) the detector 500. Additionally, it is preferable that the density of the diffused reflection layer 326a of the emission pattern 326 positioned on the +Z side (directly above) the detector 500 is reduced.

The controller 400 of the present embodiment controls, in accordance with the luminance of the first black display region 212 of the first display region 210 and the brightness of the external light detected by the detector 500, the amount of illumination light LE emitted from the illuminator 300 toward the first non-display region 220. Additionally, the controller 400 of the present embodiment controls, in accordance with the brightness of the external light, the display of the first liquid crystal display panel 110 and the luminance of the first back light 120.

Figure 14:
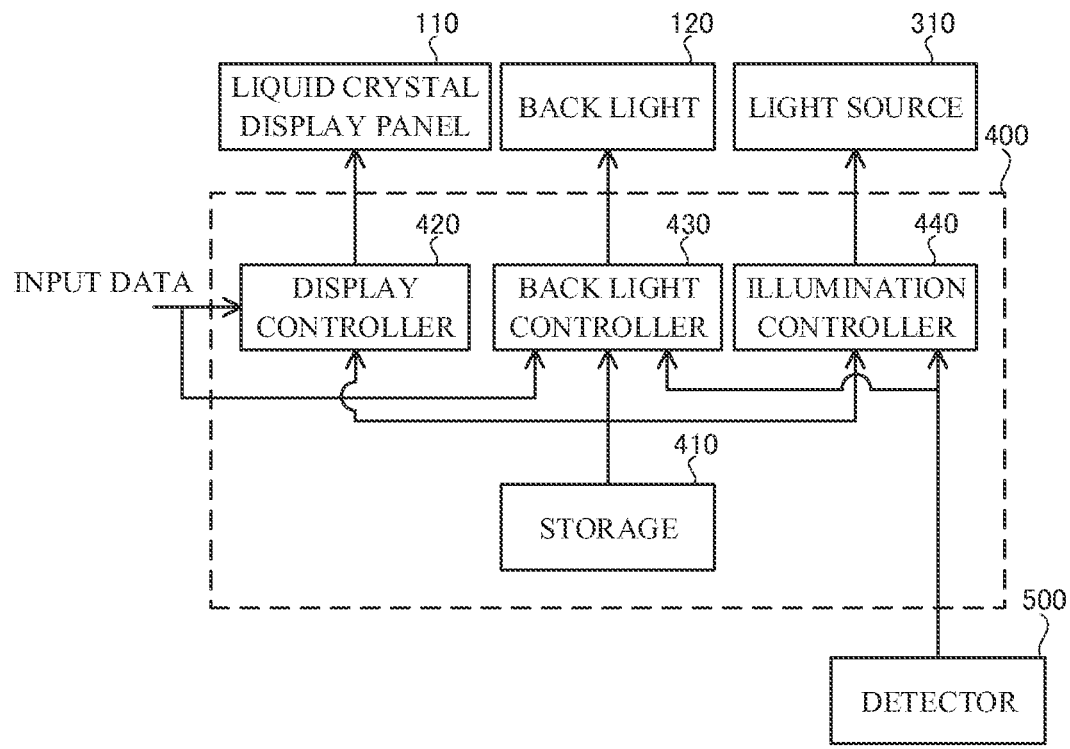
FIG. 14 is a block diagram illustrating the configuration of a controller according to Embodiment 2.

As illustrated in FIG. 14, the controller 400 of the present embodiment includes a storage 410, a display controller 420, a back light controller 430, and an illumination controller 440. The configurations of the storage 410 and the display controller 420 of the present embodiment are the same as in Embodiment 1 and, as such, here, the back light controller 430 and the illumination controller 440 of the present embodiment are described.

Figure 15:
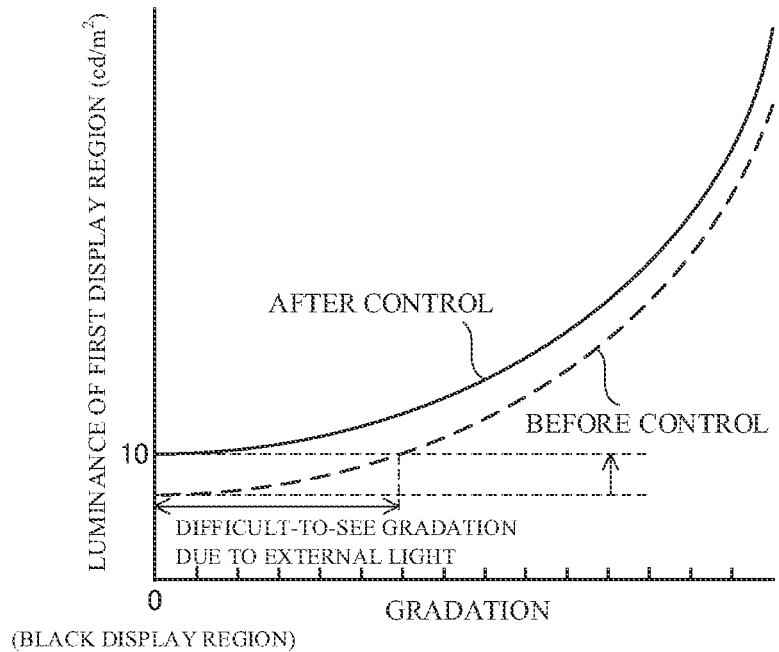
FIG. 15 is a drawing illustrating a luminance of a first display region as a function of a gradation of a first liquid crystal display, according to Embodiment 2.

The back light controller 430 of the present embodiment controls the luminance of the first back light 120 on the basis of externally inputted image data, the first gradation-luminance data stored in the storage 410, and the external light signal sent from the detector 500. For example, when the brightness of the external light is a brightness at which the reflection luminance, caused by the external light, of the first display region 210 of the decorative member 200 is 10 cd/m², as illustrated in FIG. 15, the back light controller 430 of the present embodiment controls the luminance of the first back light 120 to a luminance at which the luminance of the first black display region 212 of the first display region 210 is 10 cd/m². As a result, difficult-to-see gradations disappear, and the display device 10 of the present embodiment can improve the visibility of the display. Note that FIG. 15 illustrates only a portion of the gradations.

The other configurations of the back light controller 430 of the present embodiment are the same as the back light controller 430 of Embodiment 1.

Figure 16:
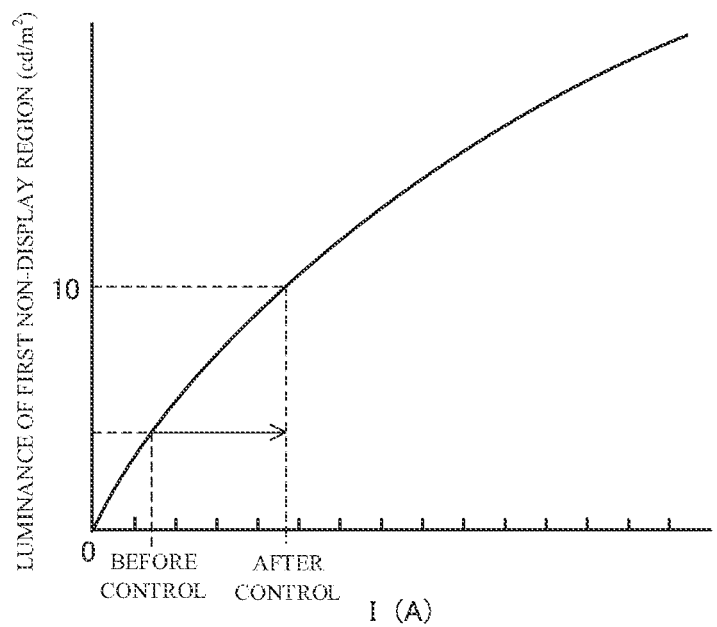
FIG. 16 is a drawing illustrating a luminance of a first non-display region as a function of a current supplied to a light source, according to Embodiment 2.

As with the illumination controller 440 of Embodiment 1, the illumination controller 440 of the present embodiment controls the amount of illumination light LE emitted from the illuminator 300 toward the first non-display region 220 by controlling the amount of light source light LS emitted from the light source 310 of the illuminator 300. The illumination controller 440 of the present embodiment controls the amount of light source light LS emitted from the light source 310 to an amount that causes the luminance of the first non-display region 220 to match the luminance of the first black display region 212 of the first display region 210. This control is carried out on the basis of the first current-luminance data and the first gradation-luminance data stored in the storage 410, and the external light signal sent from the detector 500. For example, as described above, when the brightness of the external light is a brightness at which the reflection luminance, caused by the external light, of the first display region 210 of the decorative member 200 is 10 cd/m², as illustrated in FIG. 16, the illumination controller 440 of the present embodiment controls the current I supplied to the light source 310 (the light source component 311) of the illuminator 300 to a current at which the luminance of the first non-display region 220 is 10 cd/m², thereby causing the luminance of the first non-display region 220 to match the luminance of the first black display region 212 of the first display region 210. As a result, as in Embodiment 1, the luminances of the first black display region 212 of the first display region 210 and the first non-display region 220 match and, as such, the boundary BL1 between the first display region 210 and the first non-display region 220 is more difficult to see and the design of the display device 10 is improved.

The other configurations of the illumination controller 440 of the present embodiment are the same as the illumination controller 440 of Embodiment 1.

As described above, as in Embodiment 1, the illuminator 300 illuminates the first non-display region 220 of the decorative member 200 from the back surface, thereby causing the luminance of the first non-display region 220 of the decorative member 200 to match the luminance of the first black display region 212 of the first display region 210 of the decorative member 200. As a result, in the present embodiment as well, the display device 10 can make the boundary BL1 between the first display region 210 and the first non-display region 220 more difficult to see without reducing the visibility of the display device 10. Additionally, the display device 10 changes the brightness of the display in accordance with the brightness of the external light and, as such, can improve the visibility of the display.

Embodiment 3

In the display device 10 of Embodiment 1, the light source 310 of the illuminator 300 is provided on the side surfaces of the light guide 320 of the illuminator 300. However, a configuration is possible in which the light source 310 is provided on the light guide surface 322 side of the light guide 320.

Figure 17:
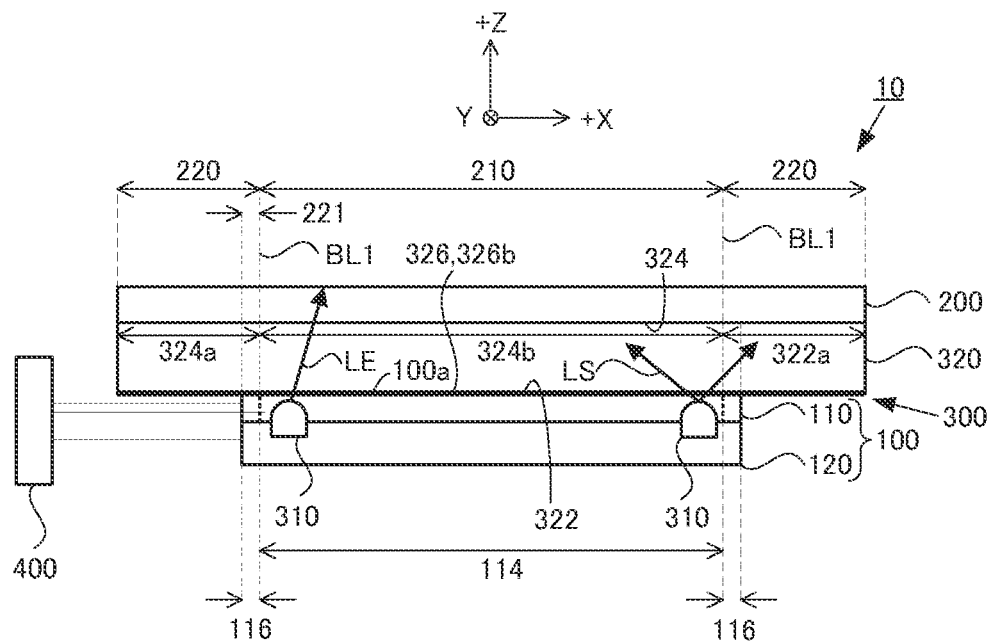
FIG. 17 is a side view illustrating a display device according to Embodiment 3.

As illustrated in FIG. 17, the display device 10 of the present embodiment includes a first liquid crystal display 100, a decorative member 200, an illuminator 300, and a controller 400. The configurations of the first liquid crystal display 100, the decorative member 200, and the controller 400 of the present embodiment are the same as in Embodiment 1 and, as such, here, the illuminator 300 of the present embodiment is described.

Figure 18:
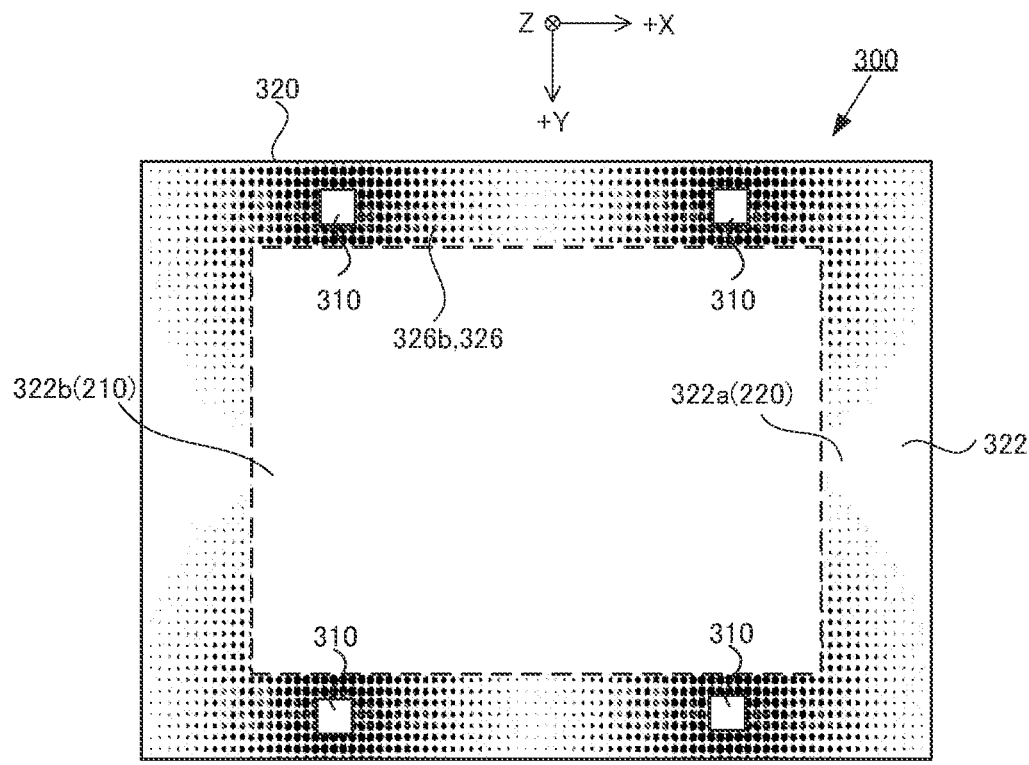
FIG. 18 is a plan view illustrating an illuminator according to Embodiment 3.
Figure 19:
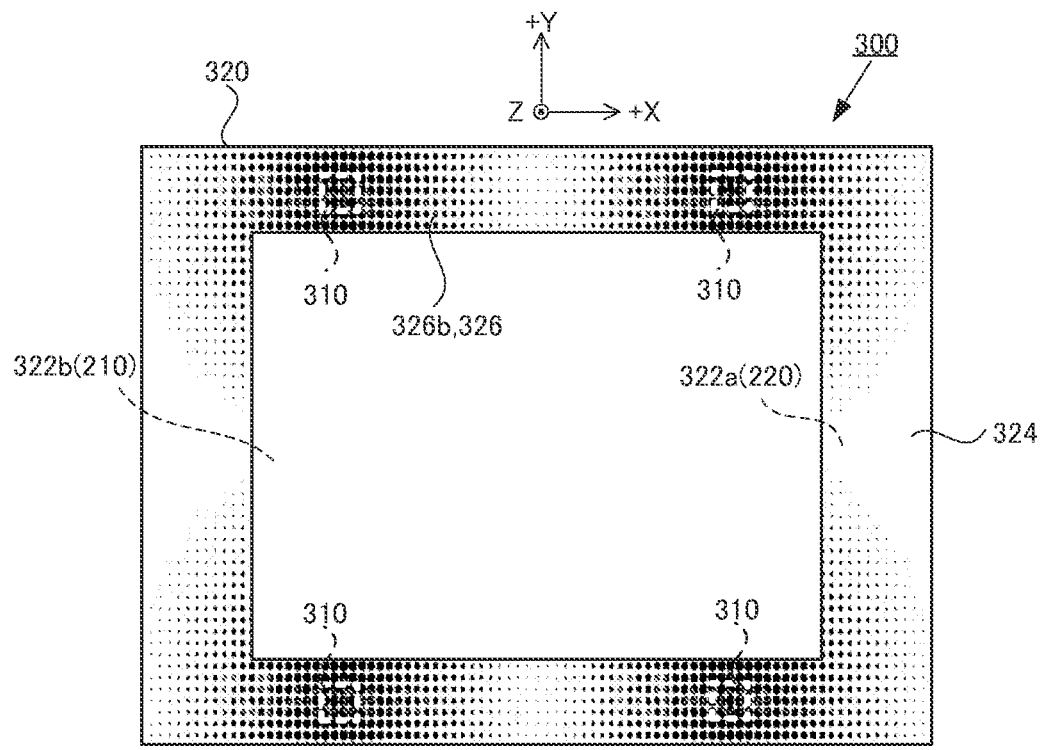
FIG. 19 is a plan view illustrating the illuminator according to Embodiment 3.

As illustrated in in FIGS. 17 to 19, the illuminator 300 of the present embodiment includes four light sources 310 and the light guide 320.

As illustrated in FIGS. 18 and 19, each of the light sources 310 of the present embodiment is provided on the −Z side of the region 322a, of the light guide surface 322 of the light guide 320, that corresponds to the first non-display region 220. Additionally, when viewed from the Z direction, pairs of the light sources 310 are disposed symmetrically on the +Y side and the −Y side of the first display region 210. The light source light LS emitted from the light source 310 is guided into the light guide 320, and is emitted from the light guide 320 toward the first non-display region 220 as the illumination light LE that illuminates the first non-display region 220. The other configurations of the light source 310 of the present embodiment are the same as the light source 310 of Embodiment 1.

As with the light guide 320 of Embodiment 1, the light guide 320 of the present embodiment guides the light source light LS and emits the guided light source light LS toward the first non-display region 220 as the illumination light LE. The light guide 320 of the present embodiment is a rectangular shaped flat plate. The light guide 320 of the present embodiment is disposed on the display surface 100a side of the first liquid crystal display 100. The light guide 320 of the present embodiment covers the display surface 100a of the first liquid crystal display 100. Additionally, the display surface 100a of the first liquid crystal display 100 is adhered to the light guide surface 322. The decorative member 200 is adhered to the light emitting surface 324.

As illustrated in FIGS. 18 and 19, the emission pattern 326 is formed in the region 322a, of the light guide surface 322, that corresponds to the first non-display region 220 of the decorative member 200. The emission pattern 326 of the present embodiment is a shielding layer 326b that blocks the light source light LS. The shielding layer 326b is printed, using black ink, in a dot form in the region 322a of the light guide surface 322. In the emission pattern 326 of the present embodiment, the size of the dots increases as distance from the light source 310 increases. The size, spacing, and the like of the dots is adjusted such that the first non-display region 220 of the decorative member 200 is uniformly illuminated. Note that, in FIG. 19, the light sources 310 are illustrated as white dashed lines.

As in Embodiment 1, in the present embodiment as well, the illuminator 300 illuminates the first non-display region 220 of the decorative member 200 from the back surface, thereby causing the luminance of the first non-display region 220 of the decorative member 200 to match the luminance of the first black display region 212 of the first display region 210 of the decorative member 200. As a result, in the present embodiment as well, the display device 10 can make the boundary BL1 between the first display region 210 and the first non-display region 220 more difficult to see without reducing the visibility of the display device 10.

Embodiment 4

In Embodiments 1 to 3, the first non-display region 220 of the decorative member 200 is uniformly illuminated by the illuminator 300. However, a configuration is possible in which the luminance of the first non-display region 220 of the decorative member 200 decreases as distance from the boundary BL1 between the first display region 210 and the first non-display region 220 increases.

Figure 20:
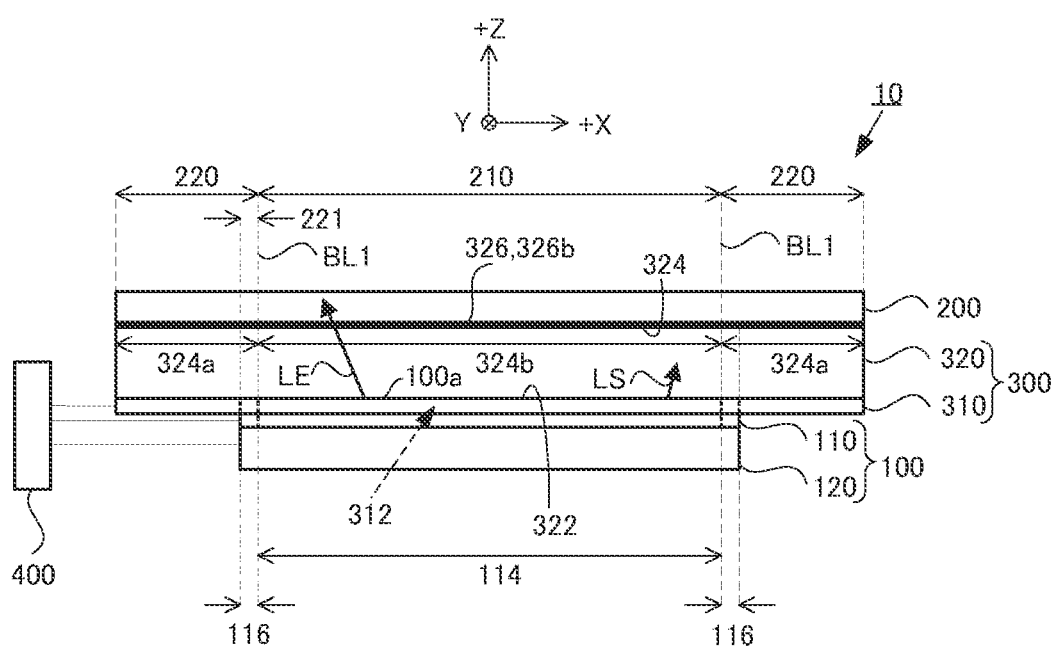
FIG. 20 is a side view illustrating a display device according to Embodiment 4.

As illustrated in FIG. 20, the display device 10 of the present embodiment includes a first liquid crystal display 100, a decorative member 200, an illuminator 300, and a controller 400. The configurations of the first liquid crystal display 100 and the decorative member 200 of the present embodiment are the same as in Embodiment 1 and, as such, here, the illuminator 300 and the controller 400 of the present embodiment are described.

Figure 21:
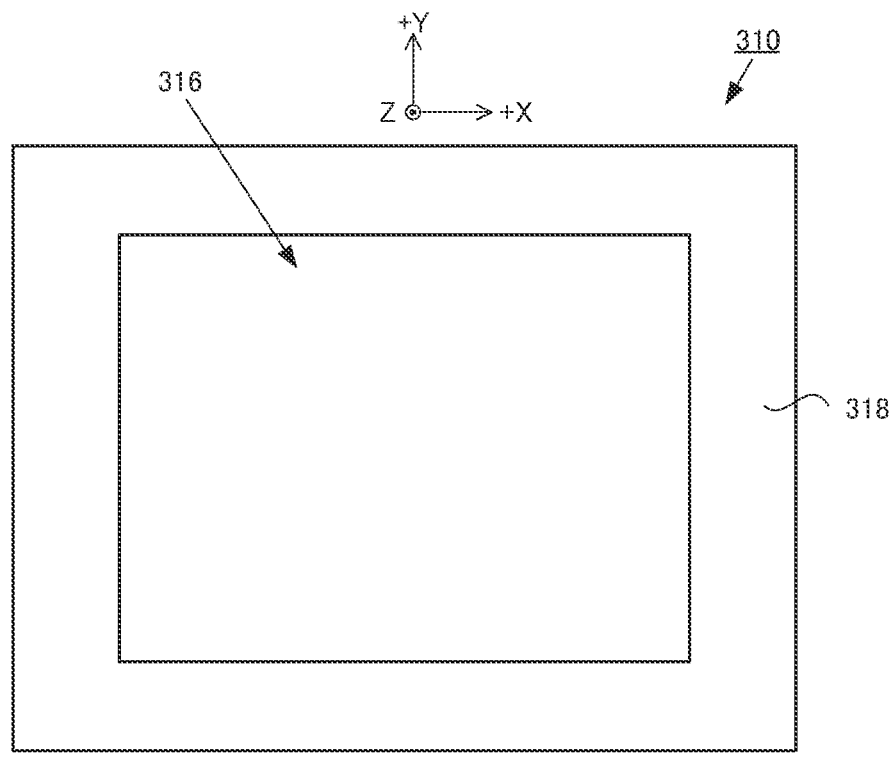
FIG. 21 is a plan view illustrating a light source according to Embodiment 4.

The illuminator 300 of the present embodiment includes a light source 310 and a light guide 320. As illustrated in FIG. 21, the light source 310 of the present embodiment is a rectangular surface light source that has an opening 316 at the center thereof. In the present embodiment, the first liquid crystal display 100 is fitted into the opening 316. The light source 310 of the present embodiment emits uniform light source light LS from a light emitting surface 318. In one example, the light source 310 of the present invention is an organic electro luminescence (EL) light source.

As with the light guide of Embodiment 1, the light guide 320 of the present embodiment guides the light source light LS and emits the guided light source light LS toward the first non-display region 220 as the illumination light LE. As with the light guide 320 of Embodiment 3, the light guide 320 of the present embodiment is a rectangular shaped flat plate. As illustrated in FIG. 20, the light guide 320 of the present embodiment is disposed on the display surface 100a side of the first liquid crystal display 100. The light guide 320 of the present embodiment covers the display surface 100a of the first liquid crystal display 100 and the light source 310. Additionally, the display surface 100a of the first liquid crystal display 100 is adhered to the light guide surface 322. The decorative member 200 is adhered to the light emitting surface 324.

Figure 22:
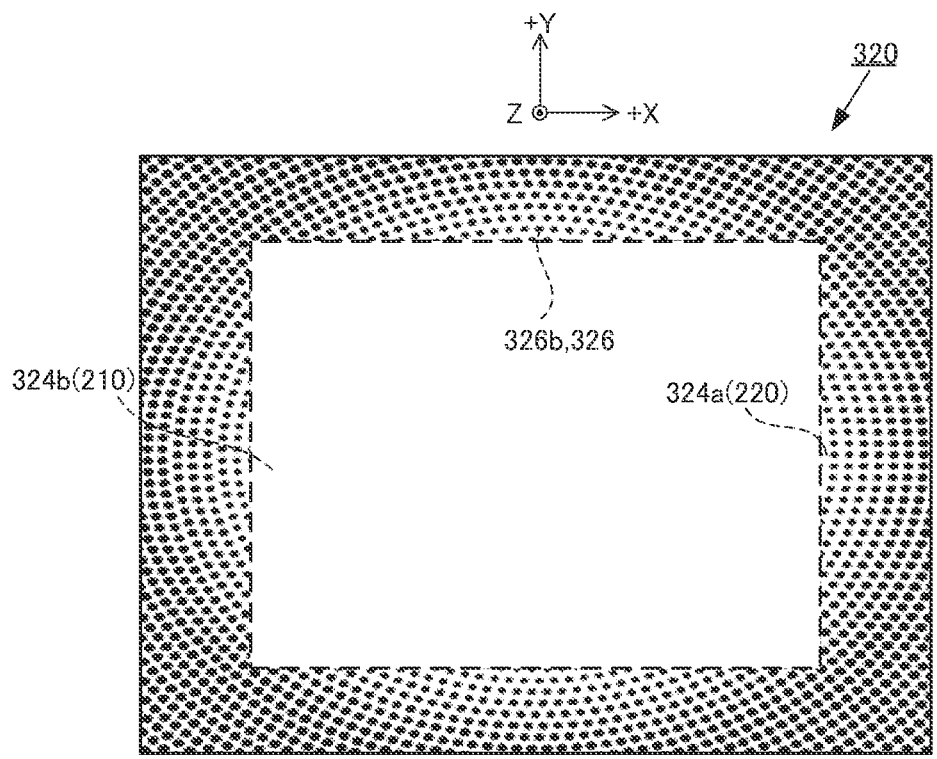
FIG. 22 is a plan view illustrating a light guide according to Embodiment 4.

In the present embodiment, as illustrated in FIG. 20, the emission pattern 326 is formed on the light emitting surface 324. Specifically, as illustrated in FIG. 22, the emission pattern 326 is formed in a region 324a, of the light emitting surface 324, that corresponds to the first non-display region 220 of the decorative member 200. As with the emission pattern of Embodiment 3, the emission pattern 326 of the present embodiment is a shielding layer 326b that blocks the light source light LS. The shielding layer 326b of the present embodiment is printed, using black ink, in a dot form in the region 324a of the light emitting surface 324. In the emission pattern 326 of the present embodiment, the distribution density of the dots increases as distance from a boundary between the region 324a of the light emitting surface 324 and a region 324b, of the light emitting surface 324, that corresponds to the first display region 210 of the decorative member 200 increases. The distribution, size, and the like of the dots are adjusted so as to reduce an emission amount of the amount of illumination light LE emitted toward the first non-display region 220 as distance from the boundary BL1 between the first display region 210 and the first non-display region 220 increases. Specifically, the distribution, size, and the like of the dots are adjusted so as to reduce the luminance of the first non-display region 220 of the decorative member 200 decreases as distance from the boundary BL1 between the first display region 210 and the first non-display region 220 increases.

As with the controller 400 of Embodiment 1, the controller 400 of the present embodiment includes a storage 410, a display controller 420, a back light controller 430, and an illumination controller 440. The storage 410, the display controller 420, and the back light controller 430 of the present embodiment are the same as in Embodiment 1 and, as such, here, the illumination controller 440 is described.

The illumination controller 440 of the present embodiment controls the amount of light source light LS emitted from the light source 310 (the amount of illumination light LE emitted from the illuminator 300 toward the first non-display region 220) on the basis of the first current-luminance data and the first gradation-luminance data stored in the storage 410. Specifically, the illumination controller 440 of the present embodiment controls the amount of light source light LS to an amount at which the luminance of the first non-display region 220 matches the luminance of the first black display region 212 of the first display region 210 at the boundary BL1 between the first display region 210 and the first non-display region 220.

Figure 23:
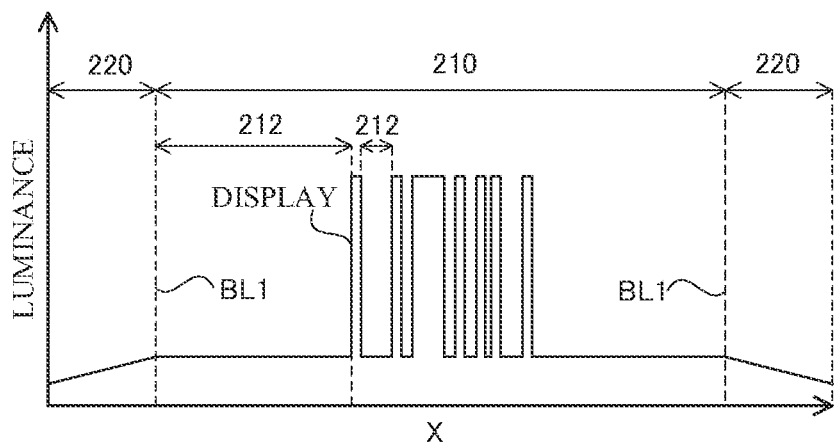
FIG. 23 is a drawing illustrating a luminance distribution in a decorative member according to Embodiment 4.

As described above, the emission pattern 326 formed on the light guide 320 is formed so as to reduce the luminance of the first non-display region 220 of the decorative member 200 as distance from the boundary BL1 between the first display region 210 and the first non-display region 220 increases. Accordingly, as illustrated in FIG. 23, the luminance of the first non-display region 220 matches the luminance of the first black display region 212 of the first display region 210 at the boundary BL1 between the first display region 210 and the first non-display region 220, and decreases as distance from the boundary BL1 increases.

As described above, the luminances of the first black display region 212 of the first display region 210 and the first non-display region 220 match at the boundary BL1 between the first display region 210 and the first non-display region 220. Accordingly, in the display device 10 of the present embodiment as well, the boundary BL1 between the first display region 210 and the first non-display region 220 can be made more difficult to see. Additionally, the design of the display device 10 is improved. Furthermore, since the luminance of the first non-display region 220 decreases as distance from the boundary BL1 increases, a natural impression is given to the user and the design of the display device 10 is further improved.

Embodiment 5

The display devices 10 of Embodiments 1 to 4 include one first liquid crystal display 100 as a display for displaying characters, images, and the like. However, a configuration is possible in which the display device 10 includes a plurality of displays.

Figure 24:
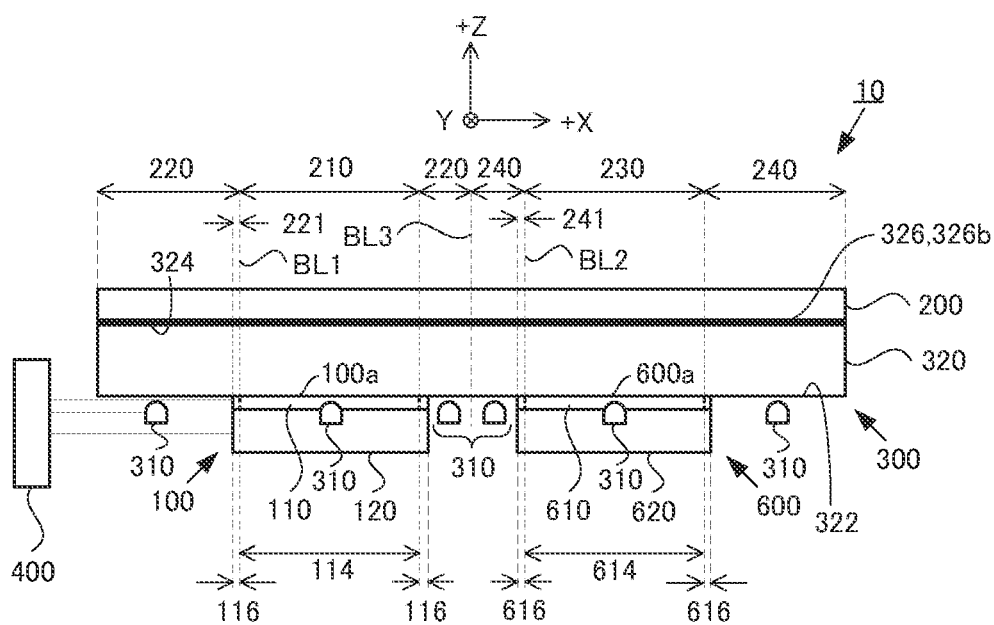
FIG. 24 is a side view illustrating a display device according to Embodiment 5.

As illustrated in FIG. 24, the display device 10 of the present embodiment includes a first liquid crystal display 100, a decorative member 200, an illuminator 300, and a controller 400. The display device 10 further includes a second liquid crystal display 600. The first liquid crystal display 100 of the present embodiment is the same as the first liquid crystal display 100 of Embodiment 1 and, as such, the second liquid crystal display 600, the decorative member 200, the illuminator 300, and the controller 400 of the present embodiment are described.

As with the first liquid crystal display 100, the second liquid crystal display 600 is a transmissive liquid crystal display device that displays characters or images. The second liquid crystal display 600 is adhered to the light guide surface 322 of the light guide 320. The second liquid crystal display 600 is disposed juxtaposed to the first liquid crystal display 100, with a spacing therebetween. The second liquid crystal display 600 includes a second liquid crystal display panel 610 and a second back light 620.

Figure 25:
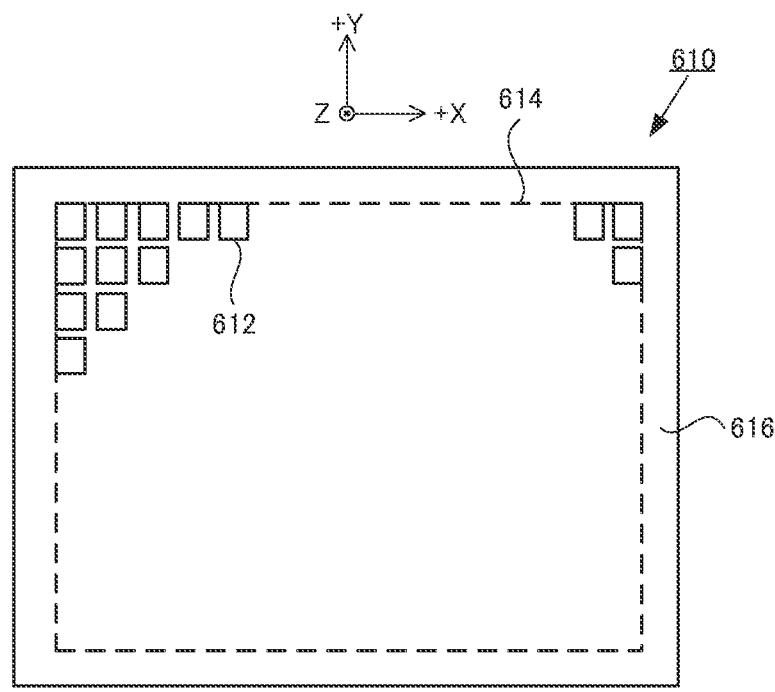
FIG. 25 is a plan view illustrating a second liquid crystal display panel according to Embodiment 5.

In one example, the second liquid crystal display panel 610 of the second liquid crystal display 600 is a horizontal electric field type liquid crystal display panel that is active matrix driven by TFTs. As illustrated in FIG. 25, the second liquid crystal display panel 610 includes a displayable region 614 in which pixels 612 are arranged in a matrix, and a frame region 616 in which wiring, drive circuitry, and the like is disposed and that surrounds the displayable region 614. As with the displayable region 114, the displayable region 614 is a region that is capable of displaying characters, images, and the like. As with the frame region 116, the frame region 616 is a region that is incapable of displaying characters, images, and the like. In the present embodiment, as illustrated in FIG. 24, a displayable region 614 corresponds to a second display region 230 of the decorative member 200.

As illustrated in FIG. 24, the second back light 620 of the second liquid crystal display 600 is arranged on a back surface side of the second liquid crystal display panel 610. In one example, the second back light 620 is implemented as a direct back light. As with the first back light 120, the second back light 620 includes a white LED element, a reflective sheet, a diffusion sheet, a lighting circuit, and the like (all not illustrated in the drawings).

The decorative member 200 of the present embodiment is disposed on the display surface 100a, 600a sides of the first liquid crystal display 100 and the second liquid crystal display 600. As with the decorative member 200 of Embodiment 1, the decorative member 200 of the present embodiment is adhered to the light emitting surface 324 of the light guide 320.

Figure 26:
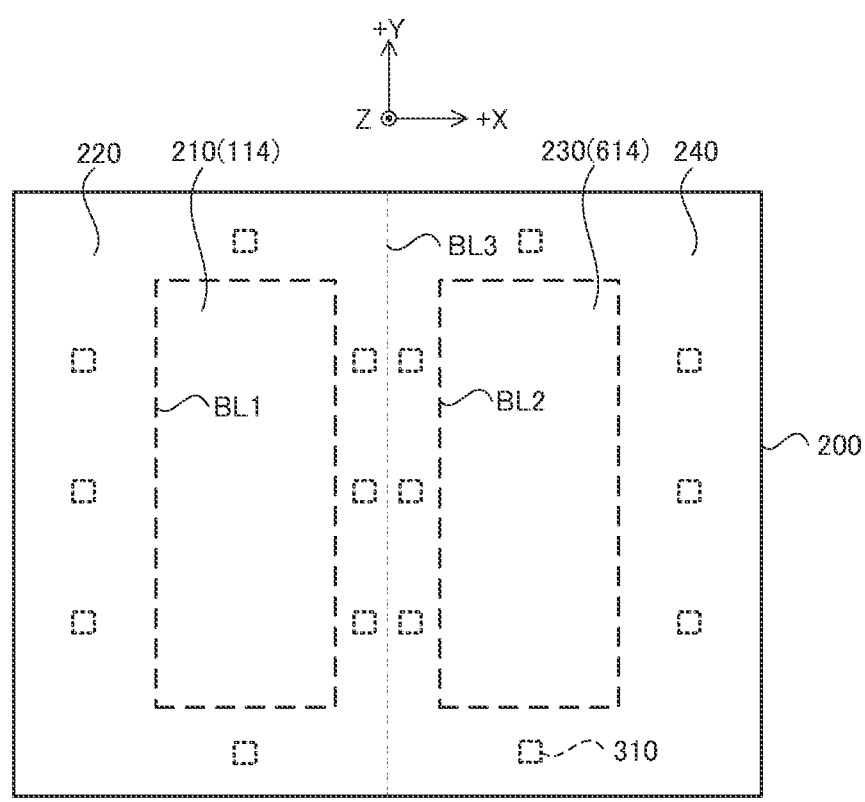
FIG. 26 is a plan view illustrating a decorative member and a light source according to Embodiment 5.

As illustrated in FIG. 26, the decorative member 200 of the present embodiment includes a first display region 210, a first non-display region 220, a second display region 230, and a second non-display region 240. As with the first display region 210 of Embodiment 1, the first display region 210 of the present embodiment corresponds to the displayable region 114 of the first liquid crystal display 100. The display of the first liquid crystal display 100 is transparently displayed in the first display region 210 of the present embodiment. The first non-display region 220 is positioned outside the first display region 210 and is adjacent to the first display region 210 and the second non-display region 240. The first non-display region 220 is a region in which the displays of the first liquid crystal display 100 and the second liquid crystal display 600 are not displayed.

The second display region 230 corresponds to the displayable region 614 of the second liquid crystal display 600. The display of the second liquid crystal display 600 is transparently displayed in the second display region 230. The second non-display region 240 is positioned outside the second display region 230 and is adjacent to the second display region 230 and the first non-display region 220. The second non-display region 240 includes a region 241 that corresponds to the frame region 616 of the second liquid crystal display panel 610. The second non-display region 240 is a region in which the displays of the first liquid crystal display 100 and the second liquid crystal display 600 are not displayed.

The other configurations of the decorative member 200 of the present embodiment are the same as the configurations of the decorative member 200 of Embodiment 1.

The illuminator 300 of the present embodiment illuminates the first non-display region 220 and the second non-display region 240 of the decorative member 200 from the back surface (the −Z side). The illuminator 300 of the present embodiment includes a plurality of light sources 310 and the light guide 320.

Figure 27:
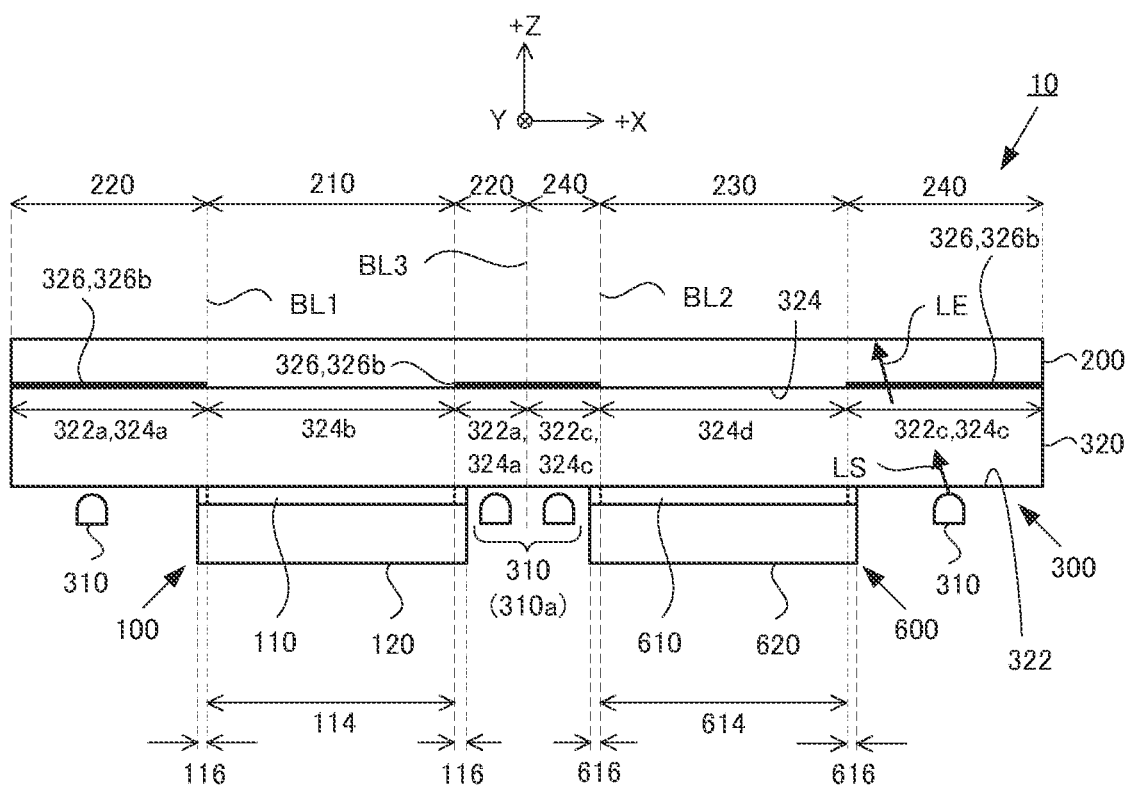
FIG. 27 is a cross-sectional view illustrating a first liquid crystal display, the second liquid crystal display, a decorative member, and a light guide according to Embodiment 5.

As illustrated in FIG. 27, each of the light sources 310 of the present embodiment is provided on the −Z side of the region 322a, of the light guide surface 322 of the light guide 320, that corresponds to the first non-display region 220, and on the −Z side of a region 322c, of the light guide surface 322 of the light guide 320, that corresponds to the second non-display region 240. Additionally, as illustrated in FIG. 26, the light sources 310 of the present embodiment are disposed so as to surround each of the first display region 210 and the second display region 230. The light source light LS emitted from the light sources 310 is guided into the light guide 320, and is emitted from the light guide 320 toward the first non-display region 220 and the second non-display region 240 as the illumination light LE that illuminates the first non-display region 220 and the second non-display region 240. The other configurations of the light sources 310 of the present embodiment are the same as the light source 310 of Embodiment 1.

The light guide 320 of the present embodiment guides the light source light LS and emits the guided light source light LS toward the first non-display region 220 and the second non-display region 240 as the illumination light LE. As with the light guide 320 of Embodiment 3, the light guide 320 of the present embodiment is a rectangular shaped flat plate. The light guide 320 of the present embodiment is disposed on the display surface 100a, 600a sides of the first liquid crystal display 100 and the second liquid crystal display 600. Additionally, the light guide 320 of the present embodiment covers the display surface 100a of the first liquid crystal display 100 and the display surface 600a of the second liquid crystal display 600. Furthermore, the display surface 100a of the first liquid crystal display 100 and the display surface 600a of the second liquid crystal display 600 are adhered to the light guide surface 322. The decorative member 200 is adhered to the light emitting surface 324.

As illustrated in FIG. 27, in the present embodiment, the emission pattern 326 is formed in the region 324a, of the light emitting surface 324, that corresponds to the first non-display region 220 of the decorative member 200, and in a region 324c, of the light emitting surface 324, that corresponds to the second non-display region 240 of the decorative member 200. As with the emission pattern of Embodiment 3, the emission pattern 326 of the present embodiment is a shielding layer 326b that blocks the light source light LS. The shielding layer 326b of the present embodiment is printed, using black ink, in a dot form.

In the region 324a of the light emitting surface 324, the distribution, size, and the like of the dots of the shielding layer 326b are adjusted so as to reduce the emission amount of the amount of illumination light LE emitted toward the first non-display region 220 as distance from the boundary BL1 between the first display region 210 and the first non-display region 220 increases. Additionally, in the region 324c of the light emitting surface 324, the distribution, size, and the like of the dots of the shielding layer 326b are adjusted so as to reduce the emission amount of the amount of illumination light LE emitted toward the second non-display region 240 as distance from a boundary BL2 between the second display region 230 and the second non-display region 240 increases. Specifically, the distribution, size, and the like of the dots of the shielding layer 326b are adjusted such that the luminance of the first non-display region 220 of the decorative member 200 decreases as distance from the boundary BL1 increases, and the luminance of the second non-display region 240 of the decorative member 200 decreases as distance from the boundary BL2 increases.

The emission pattern 326 is not formed in the region 324b, of the light emitting surface 324, that corresponds to the first display region 210 of the decorative member 200, and in a region 324d, of the light emitting surface 324, that corresponds to the second display region 230 of the decorative member 200. Accordingly, there is almost no emission of the illumination light LE toward the first display region 210 and the second display region 230 of the decorative member 200.

Figure 28:
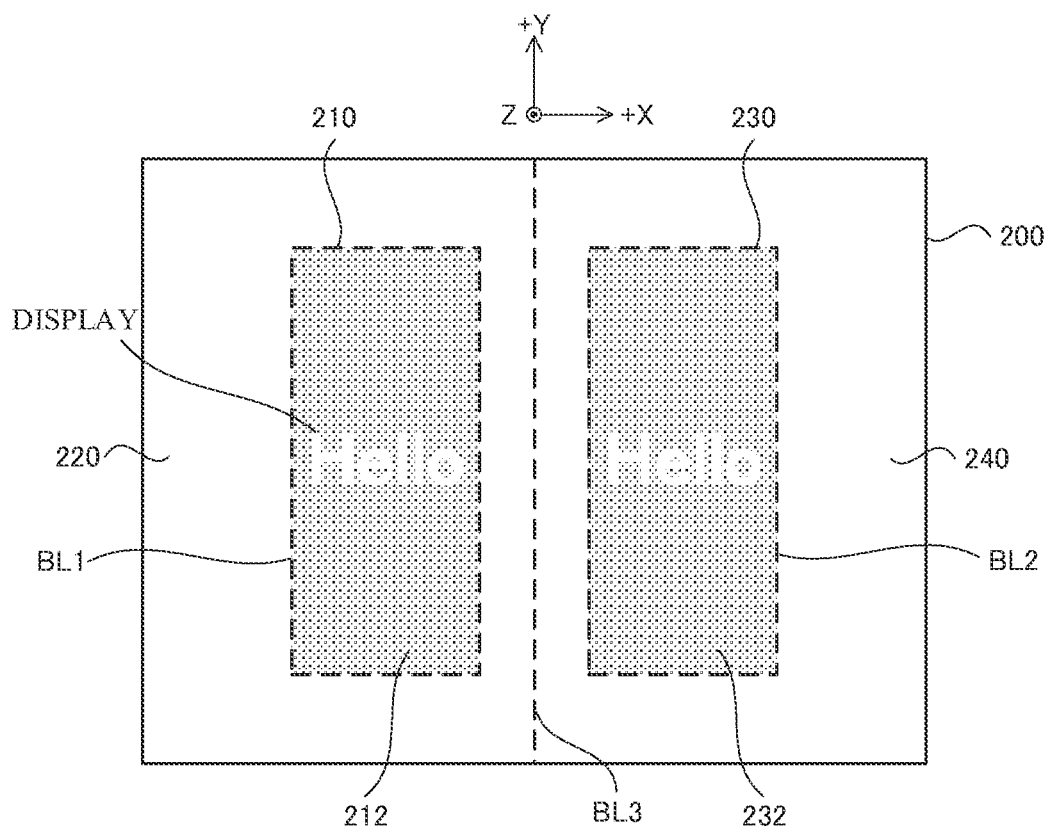
FIG. 28 is a schematic view illustrating a display in the decorative member according to Embodiment 5.

As in Embodiment 1, the controller 400 of the present embodiment controls, in accordance with the luminance of the first black display region 212 of the first display region 210, the amount of illumination light LE emitted from the illuminator 300 toward the first non-display region 220. Additionally, the controller 400 of the present embodiment controls, in accordance with the luminance of a second black display region 232 of the second display region 230, the amount of illumination light LE emitted from the illuminator 300 toward the second non-display region 240. Here, as in Embodiment 1, the first black display region 212 of the first display region 210 is a portion of the first display region 210 in which black is being displayed. As illustrated in FIG. 28, the second black display region 232 of the second display region 230 is a portion of the second display region 230 in which black is being displayed. In the present embodiment, it is assumed that the luminance of the first black display region 212 of the first display region 210 is higher than the luminance of the second black display region 232 of the second display region 230. Note that, in FIG. 28, to facilitate comprehension, hatching is used to illustrate the first black display region 212 and the second black display region 232.

Furthermore, the controller 400 of the present embodiment controls the displays of the first liquid crystal display panel 110 and the second liquid crystal display panel 610, and the luminances of the first back light 120 and the second back light 620. As with the controller 400 of Embodiment 1, the controller 400 of the present embodiment includes a storage 410, a display controller 420, a back light controller 430, and an illumination controller 440.

The storage 410 of the present embodiment stores first gradation-luminance data, second gradation-luminance data, first current-luminance data, and second current-luminance data. As in Embodiment 1, the first gradation-luminance data expresses the relationship between the gradation of the first liquid crystal display panel 110 and the luminance of the first display region 210. The second gradation-luminance data expresses the relationship between the gradation of the second liquid crystal display panel 610 and the luminance of the second display region 230. The first current-luminance data expresses the relationship between the current flowing to each light source 310 and the luminance of the first non-display region 220. The second current-luminance data expresses the relationship between the current flowing to each light source 310 and the luminance of the second non-display region 240.

The display controller 420 of the present embodiment converts externally inputted image data to image data having luminance-gradation characteristics suited for the display of the first liquid crystal display panel 110. This conversion is performed on the basis of the first gradation-luminance data. Additionally, the display controller 420 of the present embodiment converts externally inputted image data to image data having luminance-gradation characteristics suited for the display of the second liquid crystal display panel 610. This conversion is performed on the basis of the second gradation-luminance data. The display controller 420 sends image signals expressing the generated image data to the first liquid crystal display panel 110 and the second liquid crystal display panel 610.

The back light controller 430 of the present embodiment controls the luminance of the first back light 120 on the basis of externally inputted image data and the first gradation-luminance data. Additionally, the back light controller 430 of the present embodiment controls the luminance of the second back light 620 on the basis of externally inputted image data and the second gradation-luminance data. The back light controller 430 of the present embodiment sends a back light control signal expressing the luminance of the first back light 120 and a back light control signal expressing the luminance of the second back light 620 to the first back light 120 and the second back light 620, respectively.

The illumination controller 440 of the present embodiment controls the amounts of illumination light LE emitted from the illuminator 300 toward the first non-display region 220 and the second non-display region 240 by controlling the amount of light source light LS emitted from each light source 310.

In the present embodiment, the illumination controller 440 controls, on the basis of the first current-luminance data and the first gradation-luminance data, the amount of light source light LS emitted from the light sources 310 disposed in the region 322a of the light guide surface 322, except for the light sources 310 disposed in the region between the first display region 210 and the second display region 230 when viewed planarly (hereinafter referred to as "light sources 310a"). Specifically, the illumination controller 440 of the present embodiment controls the amount of light source light LS emitted from the light sources 310 disposed in the region 322a of the light guide surface 322, except for the light sources 310a, to an amount at which the luminance of the first non-display region 220 matches the luminance of the first black display region 212 of the first display region 210 at the boundary BL1 between the first display region 210 and the first non-display region 220.

Additionally, the illumination controller 440 of the present embodiment controls, on the basis of the second current-gradation data and the second gradation-luminance data, the amount of light source light LS emitted from the light sources 310 disposed in the region 322c of the light guide surface 322, except for the light sources 310a, to an amount at which the luminance of the second non-display region 240 matches the luminance of the second black display region 232 of the second display region 230 at the boundary BL2 between the second display region 230 and the second non-display region 240. Note that the region 322a of the light guide surface 322 is a region that corresponds to the first non-display region 220 of the decorative member 200. The region 322c of the light guide surface 322 is a region that corresponds to the second non-display region 240 of the decorative member 200.

Furthermore, the illumination controller 440 of the present embodiment controls, on the basis of the first current-luminance data, the first gradation-luminance data, the second current-luminance data, and the second gradation-luminance data, the amount of light source light LS emitted from the light sources 310a disposed in the region between the first display region 210 and the second display region 230. Specifically, the illumination controller 440 of the present embodiment controls the amount of light source light LS emitted from the light sources 310a to an amount at which the luminance of the first non-display region 220 matches the luminance of the first black display region 212 of the first display region 210 at the boundary BL1 between the first display region 210 and the first non-display region 220, the luminance of the second non-display region 240 matches the luminance of the second black display region 232 of the second display region 230 at the boundary BL2 between the second display region 230 and the second non-display region 240, and the luminances of the first non-display region 220 and the second non-display region 240 match at a boundary BL3 between the first non-display region 220 and the second non-display region 240.

Figure 29:
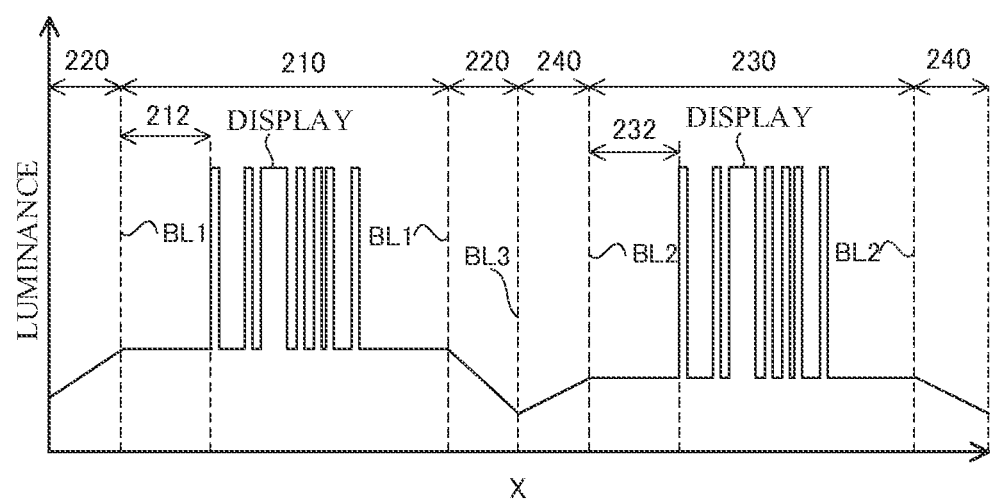
FIG. 29 is a drawing illustrating a luminance distribution in the decorative member according to Embodiment 5.

As described above, the emission pattern 326 formed on the light guide 320 is formed such that the luminance of the first non-display region 220 of the decorative member 200 decreases as distance from the boundary BL1 increases, and the luminance of the second non-display region 240 of the decorative member 200 decreases as distance from the boundary BL2 increases. Accordingly, as illustrated in FIG. 29, the luminance of the first non-display region 220 matches the luminance of the first black display region 212 of the first display region 210 at the boundary BL1 between the first display region 210 and the first non-display region 220, and decreases as distance from the boundary BL1 increases. Additionally, the luminance of the second non-display region 240 matches the luminance of the second black display region 232 of the second display region 230 at the boundary BL2 between the second display region 230 and the second non-display region 240, and decreases as distance from the boundary BL2 increases. Furthermore, the luminances of the first non-display region 220 and the second non-display region 240 match at the boundary BL3 between the first non-display region 220 and the second non-display region 240.

As described above, the luminances of the first non-display region 220 and the second non-display region 240 match at the boundary BL3 between the first non-display region 220 and the second non-display region 240 and, as such, the display device 10 of the present embodiment can make the boundary BL3 between the first non-display region 220 and the second non-display region 240 more difficult to see. Additionally, the luminances of the first black display region 212 of the first display region 210 and the first non-display region 220 match at the boundary BL1 between the first display region 210 and the first non-display region 220 and, as such, the display device 10 can make the boundary BL1 more difficult to see. The luminances of the second black display region 232 of the second display region 230 and the second non-display region 240 match at the boundary BL2 between the second display region 230 and the second non-display region 240 and, as such, the display device 10 can make the boundary BL1 more difficult to see. Furthermore, since the luminance of the first non-display region 220 decreases as distance from the boundary BL1 increases, and the luminance of the second non-display region 240 decreases as distance from the boundary BL2 increases, a natural impression is given to the user and the design of the display device 10 is further improved.

Embodiment 6

In Embodiment 5, the luminance of the first non-display region 220 decreases as distance from the boundary BL1 increases, and the luminance of the second non-display region 240 decreases as distance from the boundary BL2 increases. However, a configuration is possible in which, in the first non-display region 220 and the second non-display region 240 positioned between the first display region 210 and the second display region 230 (hereinafter referred to collectively as "third non-display region 250"), the luminance decreases as distance from the boundary BL1 between the first display region 210 and the first non-display region 220 increases.

As with the display device 10 of Embodiment 5, the display device 10 of the present embodiment includes a first liquid crystal display 100, a decorative member 200, an illuminator 300, a controller 400, and a second liquid crystal display 600. The configurations of the first liquid crystal display 100, the decorative member 200, and the second liquid crystal display 600 of the present embodiment are the same as in Embodiment 5 and, as such, here, the illuminator 300 and the controller 400 of the present embodiment are described.

Note that, in the present embodiment as well, it is assumed that the luminance of the first black display region 212 of the first display region 210 is higher than the luminance of the second black display region 232 of the second display region 230.

As with the illuminator 300 of Embodiment 5, the illuminator 300 of the present embodiment includes pluralities of light sources 310, 310a and a light guide 320. The configurations of the light sources 310, 310a of the present embodiment are the same as the configurations of the light sources 310, 310a of Embodiment 5 and, as such, the light guide 320 of the present embodiment is described.

Figure 30:
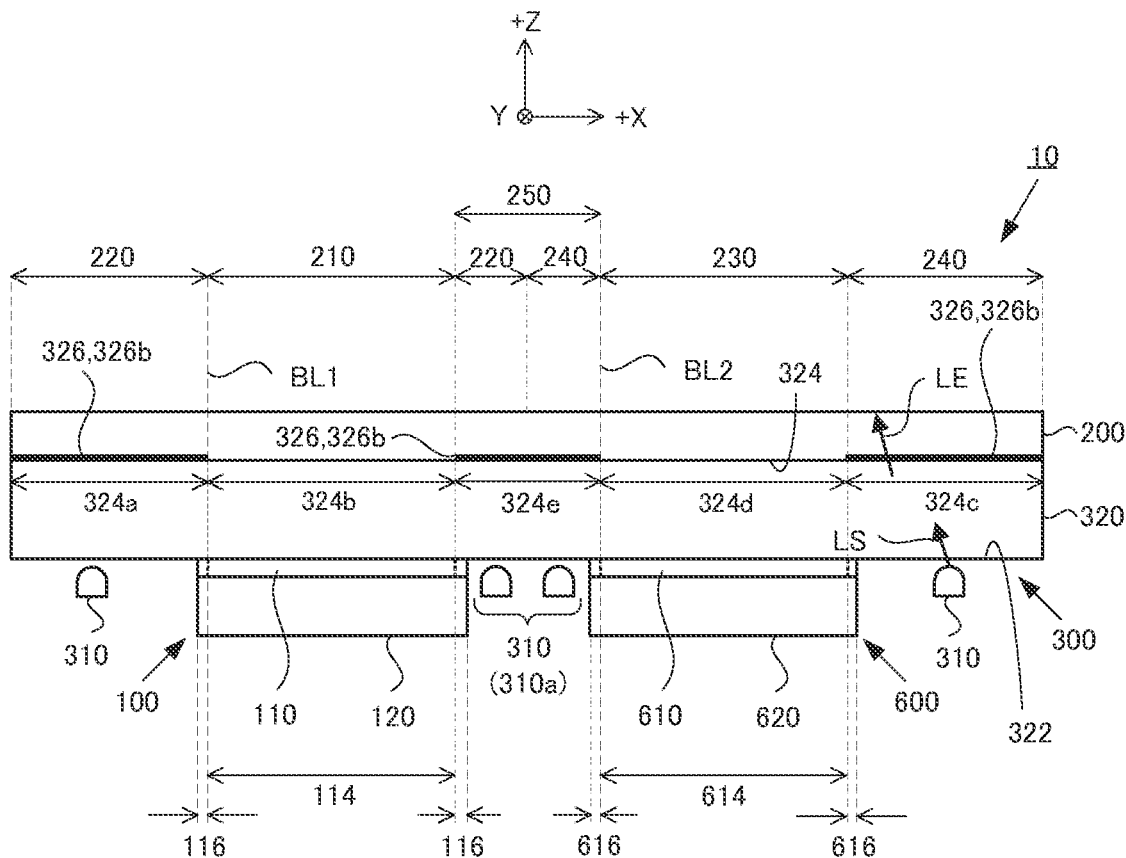
FIG. 30 is a cross-sectional view illustrating a first liquid crystal display, a second liquid crystal display, a decorative member, and a light guide according to Embodiment 6.

In the present embodiment, the emission pattern 326 formed on the light guide 320 is formed on the light emitting surface 324, as illustrated in FIG. 30. In a region 324e that corresponds to the third non-display region 250 of the present embodiment, the emission pattern 326 is formed so as to reduce the emission amount of the amount of illumination light LE emitted toward the third non-display region 250 as distance from the boundary BL1 between the first display region 210 and the first non-display region 220 increases. That is, the luminance of the third non-display region 250 of the decorative member 200 decreases as distance from the boundary BL1 between the first display region 210 and the first non-display region 220 increases.

Additionally, in the region 324a of the light emitting surface 324 that corresponds to the first non-display region 220, except for the region 324e, the emission pattern 326 of the present embodiment is formed so as to reduce the emission amount of the amount of illumination light LE emitted toward the first non-display region 220 as distance from the boundary BL1 between the first display region 210 and the first non-display region 220 increases, as in Embodiment 5. In the region 324c, of the light emitting surface 324, that corresponds to the second non-display region 240, except for the region 324e, the emission pattern 326 of the present embodiment is formed so as to reduce the emission amount of the amount of illumination light LE emitted toward the second non-display region 240 as distance from the boundary BL2 between the second display region 230 and the second non-display region 240 increases, as in Embodiment 5. That is, the emission pattern 326 of the present embodiment is formed such that the luminance of the first non-display region 220, except for the third non-display region 250, decreases as distance from the boundary BL1 increases, and the luminance of the second non-display region 240, except for the third non-display region 250, decreases as distance from the boundary BL2 increases.

The other configurations of the light guide 320 of the present embodiment are the same as the light guide 320 of Embodiment 5.

As with the controller 400 of Embodiment 5, the controller 400 of the present embodiment includes a storage 410, a display controller 420, a back light controller 430, and an illumination controller 440. The storage 410, the display controller 420, and the back light controller 430 of the present embodiment are the same as in Embodiment 5 and, as such, the illumination controller 440 of the present embodiment is described.

As with the illumination controller 440 of Embodiment 5, the illumination controller 440 of the present embodiment controls the amount of light source light LS emitted from the light sources 310 disposed in the region 322a of the light guide surface 322, except for the light sources 310a, to an amount at which the luminance of the first non-display region 220 matches the luminance of the first black display region 212 of the first display region 210 at the boundary BL1 between the first display region 210 and the first non-display region 220. As with the illumination controller 440 of Embodiment 5, the illumination controller 440 of the present embodiment controls the amount of light source light LS emitted from the light sources 310 disposed in the region 322c of the light guide surface 322, except for the light sources 310a, to an amount at which the luminance of the second non-display region 240 matches the luminance of the second black display region 232 of the second display region 230 at the boundary BL2 between the second display region 230 and the second non-display region 240.

Furthermore, the illumination controller 440 of the present embodiment controls the amount of light source light LS emitted from the light sources 310a disposed in the region between the first display region 210 and the second display region 230 (region corresponding to the third non-display region 250). Specifically, the illumination controller 440 of the present embodiment controls the amount of light source light LS emitted from the light sources 310a to an amount at which the luminance of the first non-display region 220 matches the luminance of the first black display region 212 of the first display region 210 at the boundary BL1 between the first display region 210 and the first non-display region 220, and the luminance of the second non-display region 240 matches the luminance of the second black display region 232 of the second display region 230 at the boundary BL2 between the second display region 230 and the second non-display region 240.

Figure 31:
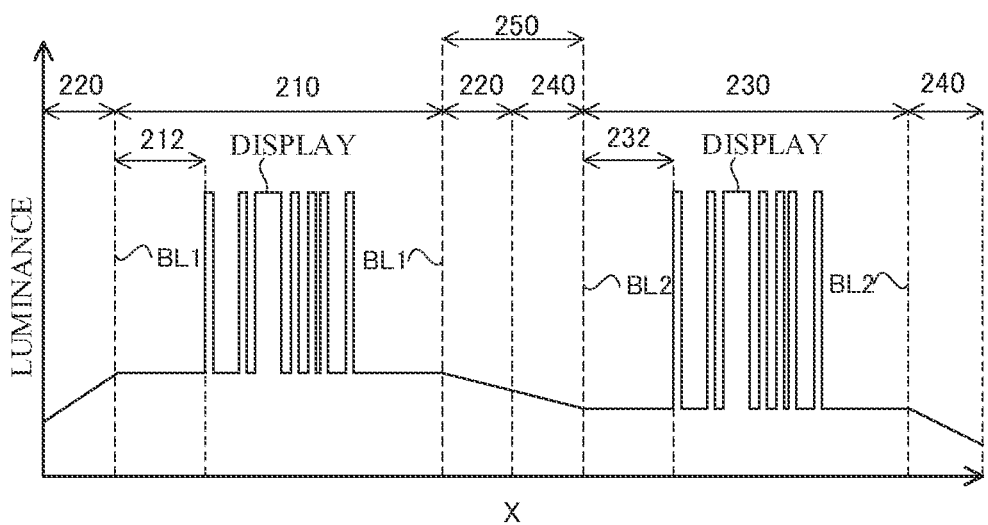
FIG. 31 is a drawing illustrating a luminance distribution in the decorative member according to Embodiment 6.

As described above, the emission pattern 326 of the present embodiment is formed such that the luminance of the first non-display region 220, except for the third non-display region 250, decreases as distance from the boundary BL1 increases, and the luminance of the second non-display region 240, except for the third non-display region 250, decreases as distance from the boundary BL2 increases. Accordingly, as illustrated in FIG. 31, the luminance of the first non-display region 220, except for the third non-display region 250, matches the luminance of the first black display region 212 of the first display region 210 at the boundary BL1 between the first display region 210 and the first non-display region 220, and decreases as distance from the boundary BL1 increases. Additionally, the luminance of the second non-display region 240, except for the third non-display region 250, matches the luminance of the second black display region 232 of the second display region 230 at the boundary BL2 between the second display region 230 and the second non-display region 240, and decreases as distance from the boundary BL2 increases.

Furthermore, the emission pattern 326 of the present embodiment is formed such that the luminance of the third non-display region 250 decreases as distance from the boundary BL1 increases. Accordingly, as illustrated in FIG. 31, the luminance of the third non-display region 250 matches the luminance of the first black display region 212 at the boundary BL1 and decreases as distance from the boundary BL1 increases, and matches the luminance of the second black display region 232 at the boundary BL2.

As described above, the luminance of the third non-display region 250 (the first non-display region 220 and the second non-display region 240 positioned between the first display region 210 and the second display region 230) matches the luminance of the first black display region 212 at the boundary BL1 and decreases as distance from the boundary BL1 increases, and matches the luminance of the second black display region 232 at the boundary BL2. Accordingly, the display device 10 of the present embodiment can make the boundary BL1 and the boundary BL2 difficult to see between the first display region 210 and the second display region 230.

Embodiment 7

In Embodiments 1 and 2, the light source 310 is disposed on the side surfaces of the light guide 320. In cases in which the light source 310 is disposed on the side surfaces of the light guide 320, the display device 10 may include a pair of polarizing plates 702, 704 on the light guide surface 322 of the light guide 320. The other configurations of the display device 10 of the present embodiment are the same as the configurations of the display device 10 of Embodiment 1.

First Liquid Crystal Display Panel

Figure 32:
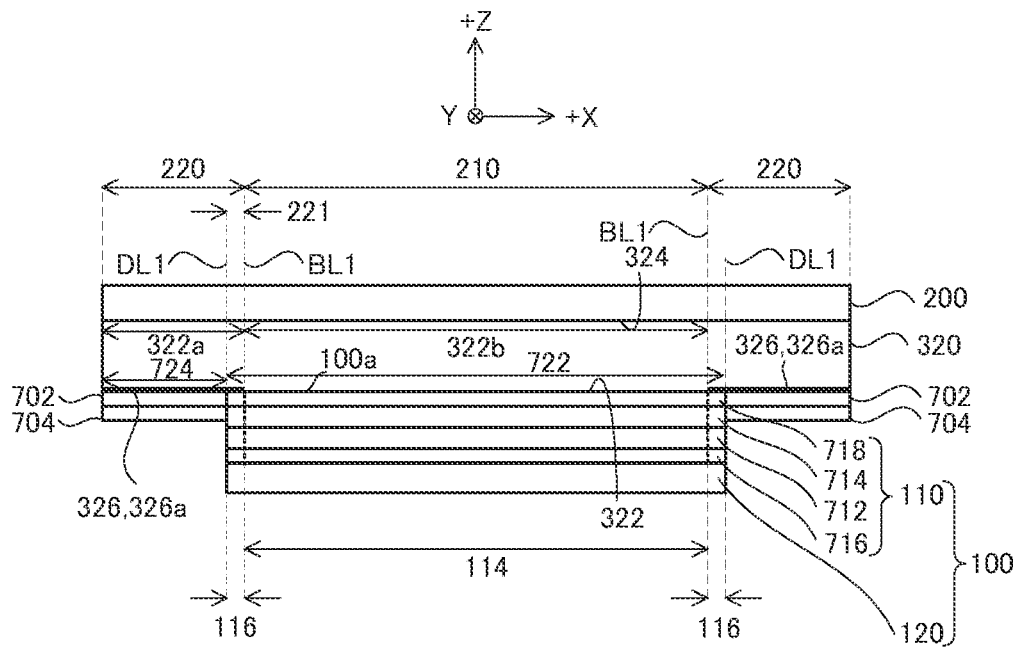
FIG. 32 is a cross-sectional view illustrating a first liquid crystal display, a decorative member, a light guide, and a polarizing plate according to Embodiment 7.

Here, firstly, a detailed description of a first liquid crystal display panel 110 of a first liquid crystal display 100 is given. The first liquid crystal display panel 110 is a horizontal electric field type liquid crystal display panel that is active matrix driven by TFTs. As illustrated in FIG. 32, the first liquid crystal display panel 110 includes a TFT substrate 712, a color filter substrate 714, a first polarizing plate 716, a second polarizing plate 718, and a non-illustrated liquid crystal. The TFT substrate 712 and the color filter substrate 714 sandwich the liquid crystal. The first polarizing plate 716 is adhered to the TFT substrate 712. The second polarizing plate 718 is adhered to the color filter substrate 714. Note that, to facilitate comprehension, hatching is omitted in FIG. 32.

In one example, the TFT substrate 712 is implemented as a glass substrate. The TFT substrate 712 includes, on a surface sandwiching the liquid crystal, a TFT, wirings, electrodes, an alignment film, and the like (all not illustrated in the drawings). The first polarizing plate 716 is adhered to a surface of a side opposite the surface of the TFT substrate 712 that sandwiches the liquid crystal.

In one example, the color filter substrate 714 is implemented as a glass substrate. The color filter substrate 714 includes, on a surface that sandwiches the liquid crystal, a stripe-like color filter, an alignment film, and the like (all not illustrated in the drawings). The second polarizing plate 718 is adhered to a surface of a side opposite the surface of the color filter substrate 714 that sandwiches the liquid crystal. The color filter substrate 714 and the TFT substrate 712 are adhered to each other by a non-illustrated sealing material.

The first polarizing plate 716 and the second polarizing plate 718 are disposed in a cross-Nicol arrangement, and a transmission axis of the first polarizing plate 716 and a transmission axis of the second polarizing plate 718 are orthogonal to each other.

Pair of Polarizing Plates

As illustrated in FIG. 32, the pair of polarizing plates 702, 704 is provided in a region 724 of the light guide surface 322 in which the first liquid crystal display 100 is not adhered (surrounding region of a region 722 in which the first liquid crystal display 100 is adhered). The pair of polarizing plates 702, 704 is positioned on the −Z side of the emission pattern 326 (the diffused reflection layer 326a) formed on the light guide surface 322, and overlaps the emission pattern 326. In the present embodiment, the polarizing plate 702 is adhered in the region 724.

The polarizing plate 702 and the polarizing plate 704 are disposed in a cross-Nicol arrangement, and a transmission axis of the polarizing plate 702 and a transmission axis of the polarizing plate 704 are orthogonal to each other. It is preferable that the polarizing plate 702 positioned on the light guide surface 322 side and the second polarizing plate 718 positioned on the light guide surface 322 side of the first liquid crystal display panel 110 are the same type of polarizing plate. Additionally, it is preferable that the polarizing plate 704 and the first polarizing plate 716 of the first liquid crystal display panel 110 are the same type of polarizing plate.

With the display device 10 of the present embodiment, the polarizing plate 702 is provided in the region 724 of the light guide surface 322 in which the first liquid crystal display 100 is not adhered. As such, regardless of the position of the surface of the decorative member 200, the light guide 320 and the polarizing plate (the polarizing plate 702 or the second polarizing plate 718) are disposed in order on the −Z side of the decorative member 200 when viewed from the user side (the +Z side). As a result, a reflectance of external light of the display device 10 is substantially the same, regardless of the position of the surface of the decorative member 200 and, as such, a reflection color of the display device 10 is also substantially the same, regardless of the position of the surface of the decorative member 200.

Accordingly, in a state in which the first liquid crystal display 100 is not displaying characters, images, or the like, the display device 10 can make it more difficult for the user to see a boundary DL1 between the region 722 of the light guide surface 322 in which the first liquid crystal display 100 is adhered and the region 724 in which the first liquid crystal display 100 is not adhered. Furthermore, since the polarizing plate 702 and the polarizing plate 704 are disposed in a cross-Nicol arrangement, the display device 10 can sufficiently block the external light and make it more difficult for the user to see the boundary DL1.

Additionally, as in Embodiment 1, in the present embodiment as well, the illuminator 300 illuminates the first non-display region 220 of the decorative member 200 from the back surface, thereby causing the luminance of the first non-display region 220 of the decorative member 200 to match the luminance of the first black display region 212 of the first display region 210 of the decorative member 200. Accordingly, the display device 10 of the present embodiment can make the boundary BL1 between the first display region 210 and the first non-display region 220 more difficult to see.

Embodiment 8

In Embodiments 3 to 6, the light source 310 is provided on the-Z side surfaces of the light guide surface 322 of the light guide 320. In cases in which the light source 310 is disposed on the −Z side of the light guide surface 322 of the light guide 320, the display device 10 may include the pair of polarizing plates 702, 704 on the light guide surface 322 of the light guide 320. In such a case, the emission pattern 326 is formed on the polarizing plate 704. Specifically, the pair of polarizing plates 702, 704 is provided between the light guide 320 and the emission pattern 326. The other configurations of the display device 10 of the present embodiment are the same as the configurations of the display device 10 of Embodiment 2. Note that, as in Embodiment 7, the first liquid crystal display panel 110 includes a TFT substrate 712, a color filter substrate 714, a first polarizing plate 716, a second polarizing plate 718, and a liquid crystal.

Figure 33:
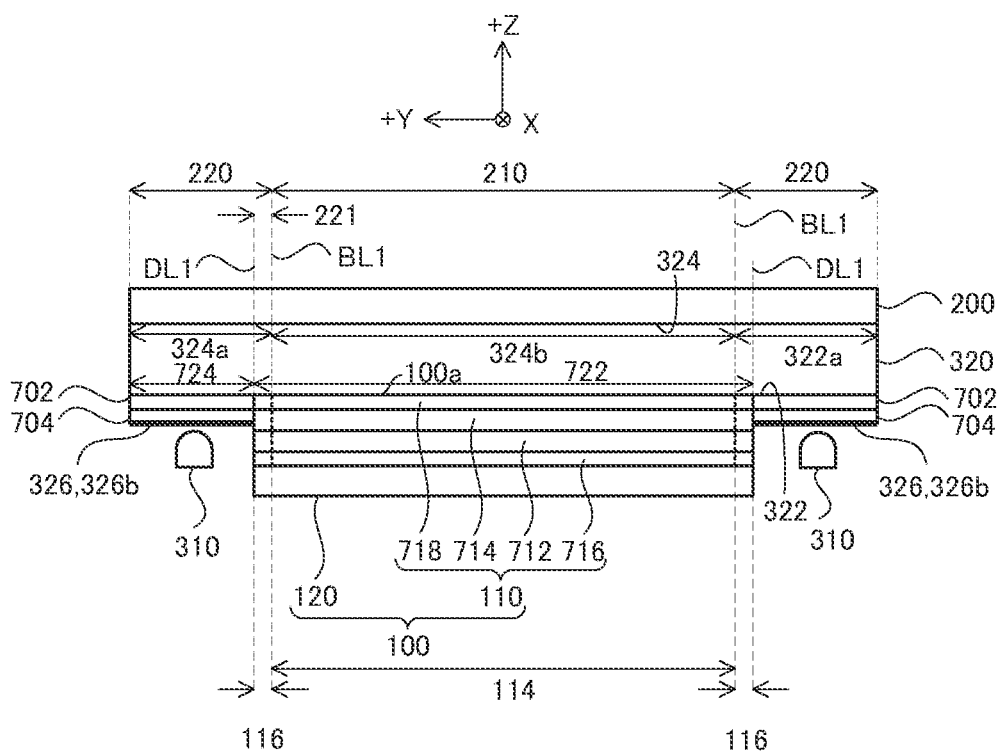
FIG. 33 is a cross-sectional view illustrating a first liquid crystal display, a decorative member, a light guide, and a polarizing plate according to Embodiment 8.

As illustrated in FIG. 33, as in Embodiment 7, the pair of polarizing plates 702, 704 is provided in the region 724 of the light guide surface 322 in which the first liquid crystal display 100 is not adhered. As in Embodiment 7, the polarizing plate 702 and the polarizing plate 704 are disposed in a cross-Nicol arrangement. In the present embodiment as well, it is preferable that the polarizing plate 702 and the second polarizing plate 718 are the same type of polarizing plate. Additionally, it is preferable that the polarizing plate 704 and the first polarizing plate 716 are the same type of polarizing plate. Note that, to facilitate comprehension, hatching is omitted in FIG. 33.

The emission pattern 326 of the present embodiment provided on the polarizing plate 704 positioned on the −Z side. The configuration of the emission pattern 326 of the present embodiment is the same as the configuration of the emission pattern 326 of Embodiment 2. The light source 310 of the present embodiment is positioned on the −Z side of the emission pattern 326.

In the present embodiment as well, regardless of the position of the surface of the decorative member 200, the light guide 320 and the polarizing plate (the polarizing plate 702 or the second polarizing plate 718) are disposed in order on the −Z side of the decorative member 200 when viewed from the user side (the +Z side). As a result, the reflectance of the external light of the display device 10 is substantially the same, regardless of the position of the surface of the decorative member 200 and, as such, the reflection color of the display device 10 is also substantially the same, regardless of the position of the surface of the decorative member 200.

Accordingly, in a state in which the first liquid crystal display 100 is not displaying characters, images, or the like, the display device 10 can make it more difficult to see the boundary DL1 between the region 722 of the light guide surface 322 in which the first liquid crystal display 100 is adhered and the region 724 in which the first liquid crystal display 100 is not adhered. Additionally, since the polarizing plate 702 and the polarizing plate 704 are disposed in a cross-Nicol arrangement, the display device 10 can sufficiently block the external light and make it more difficult for the user to see the boundary DL1. Furthermore, since the polarizing plate 702 and the polarizing plate 704 are disposed in a cross-Nicol arrangement, the display device 10 make it more difficult for the user to see the light source 310 and the emission pattern 326.

In the present embodiment as well, as in Embodiment 2, the illuminator 300 illuminates the first non-display region 220 of the decorative member 200 from the back surface, thereby causing the luminance of the first non-display region 220 of the decorative member 200 to match the luminance of the first black display region 212 of the first display region 210 of the decorative member 200. Accordingly, the display device 10 can make the boundary BL1 between the first display region 210 and the first non-display region 220 more difficult to see.

Modified Examples

Embodiments have been described, but various modifications can be made to the present disclosure without departing from the spirit and scope of the present disclosure.

For example, the first liquid crystal display panel 110 and second liquid crystal display panel 610 are not limited to horizontal electric field type liquid crystal display panels. A configuration is possible in which the type of the first liquid crystal display panel 110 and the second liquid crystal display panel 610 is a vertical alignment (VA) mode, a twisted nematic (TN) mode, or the like.

The light source component 311 of the light source 310 is not limited to a white LED element. A configuration is possible in which the light source component 311 is a 3-in-1 LED element that emits red light, green light, and blue light. Additionally, the light source 310 of embodiment 4 is not limited to organic EL.

The emission pattern 326 formed on the light guide 320 is not limited to the diffused reflection layer 326a and the shielding layer 326b. For example, a configuration is possible in which the emission pattern 326 is a prism surface formed on the light guide surface 322 of the light emitting surface 324. Additionally, a configuration is possible in which the emission pattern 326 is formed on the light guide surface 322 and the light emitting surface 324.

In Embodiment 2, the controller 400 controls, on the basis of the brightness of the external light, the luminance of the first back light 120 and the amount of illumination light LE emitted toward the first non-display region 220 (the amount of light source light LS). However, a configuration is possible in which the controller 400 controls, on the basis of at least one of the brightness and a color temperature of the external light detected by the detector 500, the luminance of the first back light 120 and the amount of illumination light LE emitted toward the first non-display region 220.

In the display device 10 of Embodiments 3 to 8, a configuration is possible in which the controller 400 controls, on the basis of at least one of the brightness and the color temperature of the external light detected by the detector 500, the luminance of the first back light 120, and the amount of illumination light LE emitted toward the first non-display region 220 or the first non-display region 220 and the second non-display region 240. Note that it is preferable that the detector 500 is black, except for a light-receiving surface that receives the external light. Such a configuration will make it more difficult for the user to see the detector 500.

Figure 34:
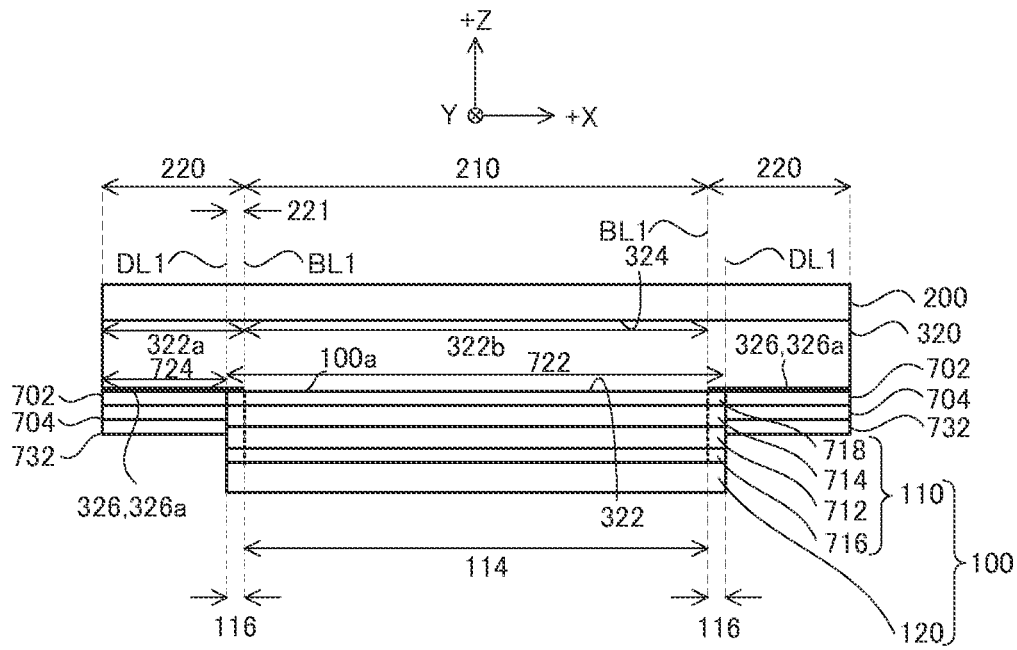
FIG. 34 is a cross-sectional view illustrating a light blocking plate according to a modified example.

In the display device 10 of Embodiment 7, a configuration is possible in which a light blocking plate 732 is provided on the −Z side of the polarizing plate 704, as illustrated in FIG. 34. As a result, the display device 10 can further block the external light, thereby making it even more difficult for the user to see the boundary DL1. Since the polarizing plate 702 and the polarizing plate 704 are disposed in a cross-Nicol arrangement, the external light reflected by the light blocking plate 732 is blocked by the polarizing plates 702, 704, thereby making it more difficult for the user to see the boundary DL1. In one example, the light blocking plate 732 is a flat plate formed from a black resin.

Figure 35:
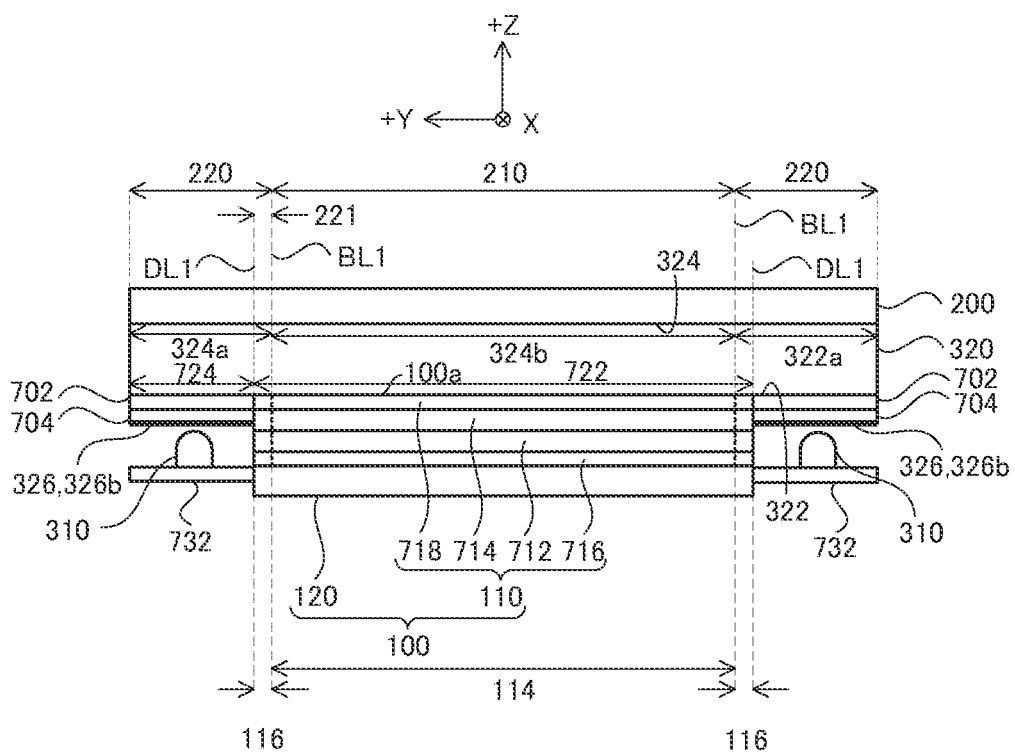
FIG. 35 is a cross-sectional view illustrating a light blocking plate according to a modified example.

In the display device 10 of Embodiment 7, a configuration is possible in which the light blocking plate 732 is provided on the −Z side of the light source 310, as illustrated in FIG. 35. As a result, the display device 10 can further block the external light, thereby making it even more difficult for the user to see the boundary DL1.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display device comprising:
   a first liquid crystal display;
   a decorative member that is disposed on a display surface side of the first liquid crystal display, and includes:
      a first display region in which a display of the first liquid crystal display is transparently displayed,
      a first non-display region adjacent to the first display region, and
      a decoration layer formed across the first display region and the first non-display region;
   an illuminator that illuminates the first non-display region from a back surface; and
   a controller that controls, in accordance with a luminance of a first black display region, of the first display region, that corresponds to a black display portion of the first liquid crystal display, an amount of illumination light emitted from the illuminator toward the first non-display region to an amount that causes a luminance of the first non-display region to match the luminance of the first black display region.

2. The display device according to claim 1, wherein the illuminator includes a light source, and a light guide that guides light source light emitted from the light source and emits the guided light source light as the illumination light toward the first non-display region.

3. The display device according to claim 2, wherein the light guide reduces an emission amount of the illumination light emitted toward the first non-display region as a distance from a boundary between the first display region and the first non-display region increases.

4. The display device according to claim 1, further comprising:
   a detector that detects external light, wherein the controller controls the amount of illumination light in accordance with at least one of a brightness and a color temperature of the external light detected by the detector.

5. The display device according to claim 1, further comprising:
a second liquid crystal display disposed juxtaposed to the first liquid crystal display, wherein
the decorative member includes a second display region in which a display of the second liquid crystal display is transparently displayed, and a second non-display region adjacent to the first non-display region and the second display region,
the illuminator illuminates the first non-display region and the second non-display region from a back surface, and includes a light source and a light guide that guides light source light emitted from the light source and emits the guided light source light as the illumination light toward the first non-display region and the second non-display region,
in the first non-display region and the second non-display region positioned between the first display region and the second display region, the light guide reduces an emission amount of the illumination light emitted toward the first non-display region as a distance from a boundary between the first display region and the first non-display region increases, and reduces an emission amount of the illumination light emitted toward the second non-display region as a distance from a boundary between the second display region and the second non-display region increases, and
the controller controls the amount of illumination light emitted from the illuminator toward the first non-display region in accordance with the luminance of the first black display region and controls an amount of illumination light emitted from the illuminator toward the second non-display region in accordance with a luminance of a second black display region, of the second display region, that corresponds to a black display portion of the second liquid crystal display, thereby causing the luminance of the first non-display region and a luminance of the second non-display region to match at a boundary between the first non-display region and the second non-display region positioned between the first display region and the second display region.

6. The display device according to claim 5, further comprising:
a detector that detects external light, wherein
the controller controls the amount of illumination light emitted from the illuminator toward the first non-display region and the amount of illumination light emitted from the illuminator toward the second non-display region in accordance with at least one of a brightness and a color temperature of the external light detected by the detector.

7. The display device according to claim 1, further comprising:
a second liquid crystal display disposed juxtaposed to the first liquid crystal display, wherein
the decorative member includes a second display region in which a display of the second liquid crystal display is transparently displayed, and a second non-display region adjacent to the first non-display region and the second display region,
a luminance of a second black display region, of the second display region, that corresponds to a black display portion of the second liquid crystal display is less than the luminance of the first black display region,
the illuminator illuminates the first non-display region and the second non-display region from the back surface, and includes a light source and a light guide that guides light source light emitted from the light source and emits the guided light source light as the illumination light toward the first non-display region and the second non-display region,
in the first non-display region and the second non-display region positioned between the first display region and the second display region, the light guide reduces emission amounts of the illumination light emitted toward the first non-display region and the second non-display region as a distance from a boundary between the first display region and the first non-display region increases, and
the controller controls the amount of illumination light emitted from the illuminator toward the first non-display region in accordance with the luminance of the first black display region and controls an amount of illumination light emitted from the illuminator toward the second non-display region in accordance with the luminance of the second black display region, thereby causing a luminance of the second non-display region and the luminance of the second black display region to match at a boundary between the second display region and the second non-display region positioned between the first display region and the second display region.

8. The display device according to claim 7, further comprising:
a detector that detects external light, wherein
the controller controls the amount of illumination light emitted from the illuminator toward the first non-display region and the amount of illumination light emitted from the illuminator toward the second non-display region in accordance with at least one of a brightness and a color temperature of the external light detected by the detector.

* * * * *